A. B. KNOTTS.
MEANS FOR OPERATING MACHINE GUNS.
APPLICATION FILED FEB. 1, 1916.
1,198,557.
Patented Sept. 19, 1916.
15 SHEETS—SHEET 1.
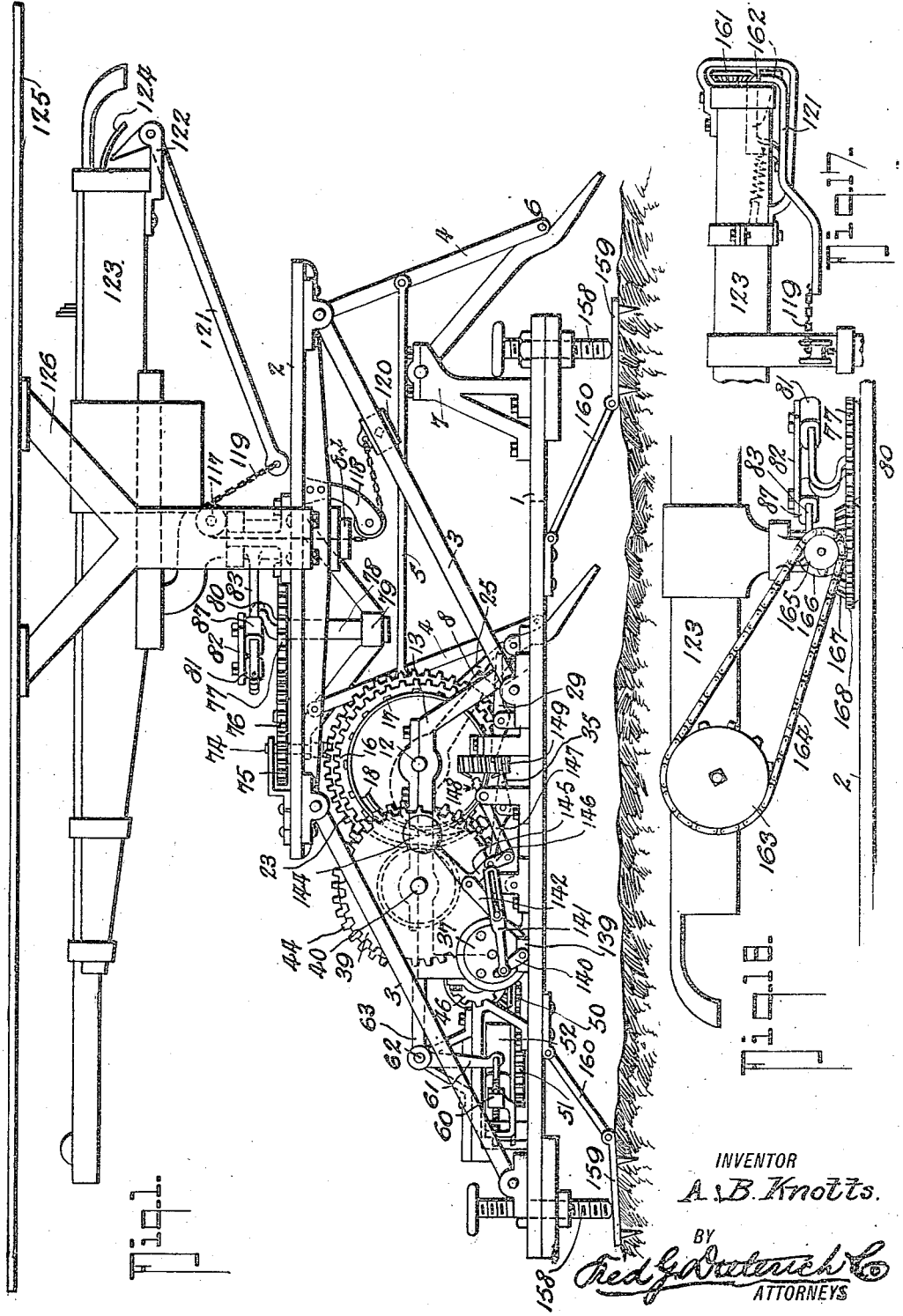
INVENTOR
A. B. Knotts.
BY
Fred G. Dieterich & Co.
ATTORNEYS

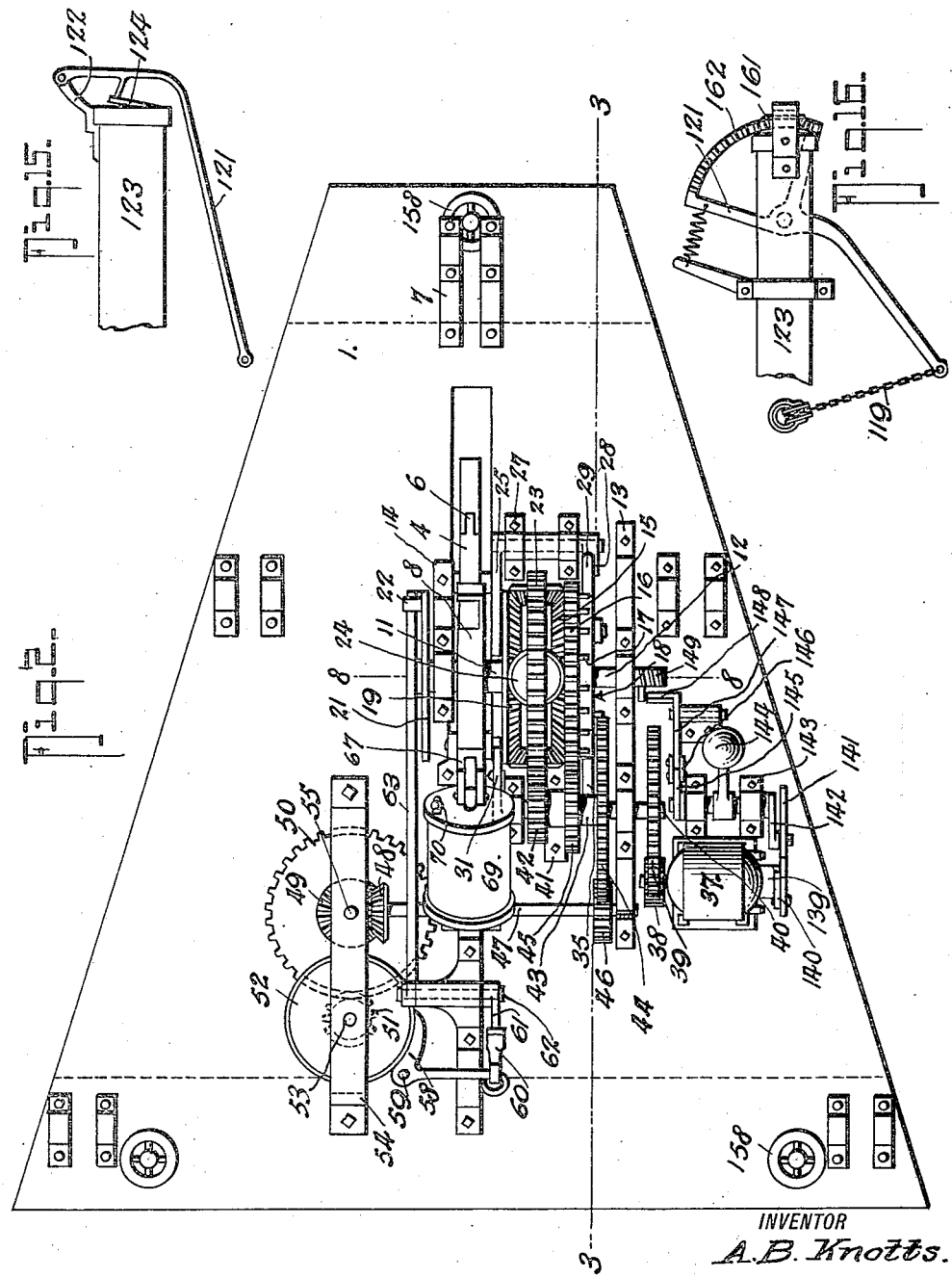

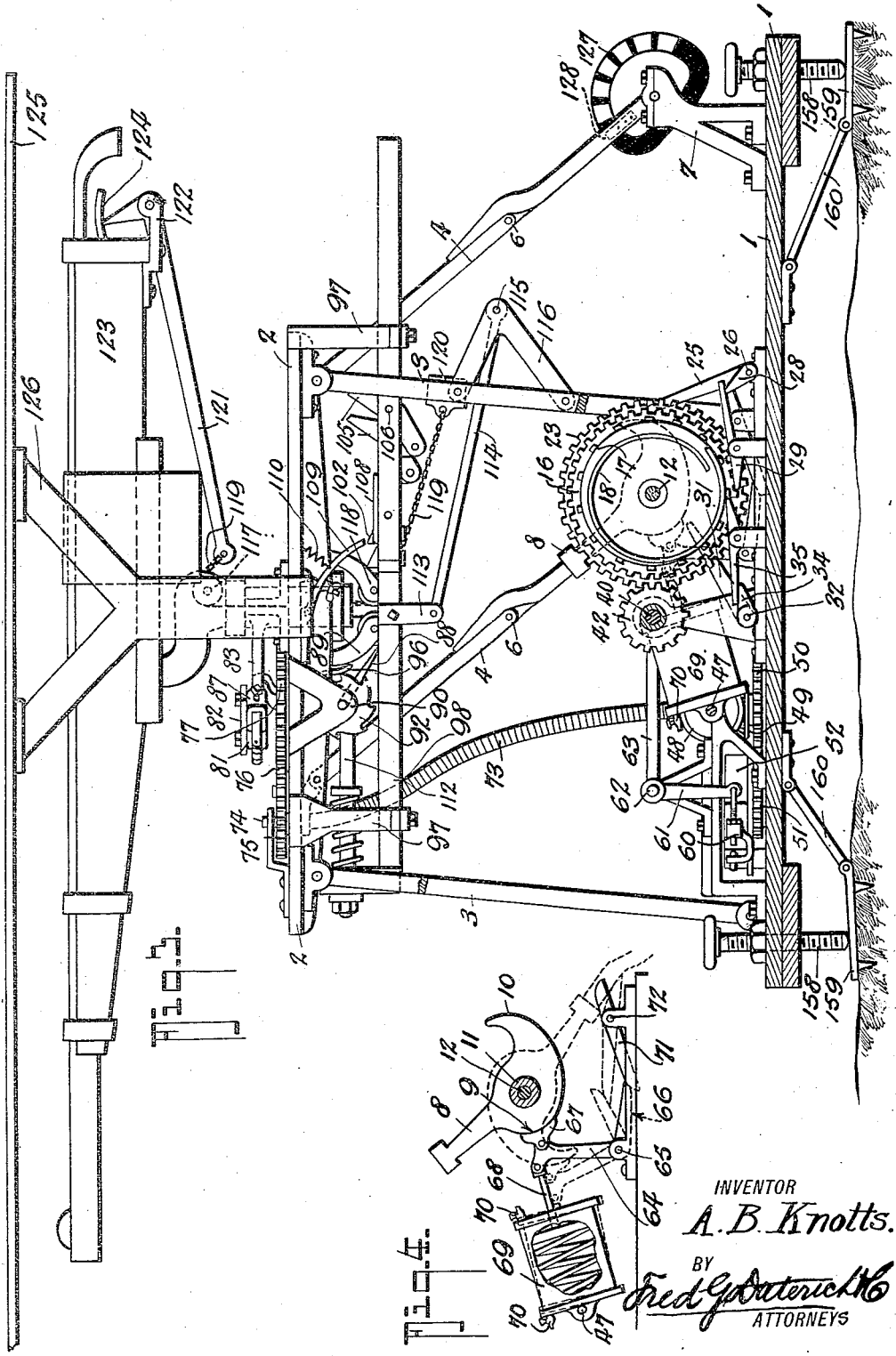

A. B. KNOTTS.
MEANS FOR OPERATING MACHINE GUNS.
APPLICATION FILED FEB. 1, 1916.
1,198,557.
Patented Sept. 19, 1916.
15 SHEETS—SHEET 4.
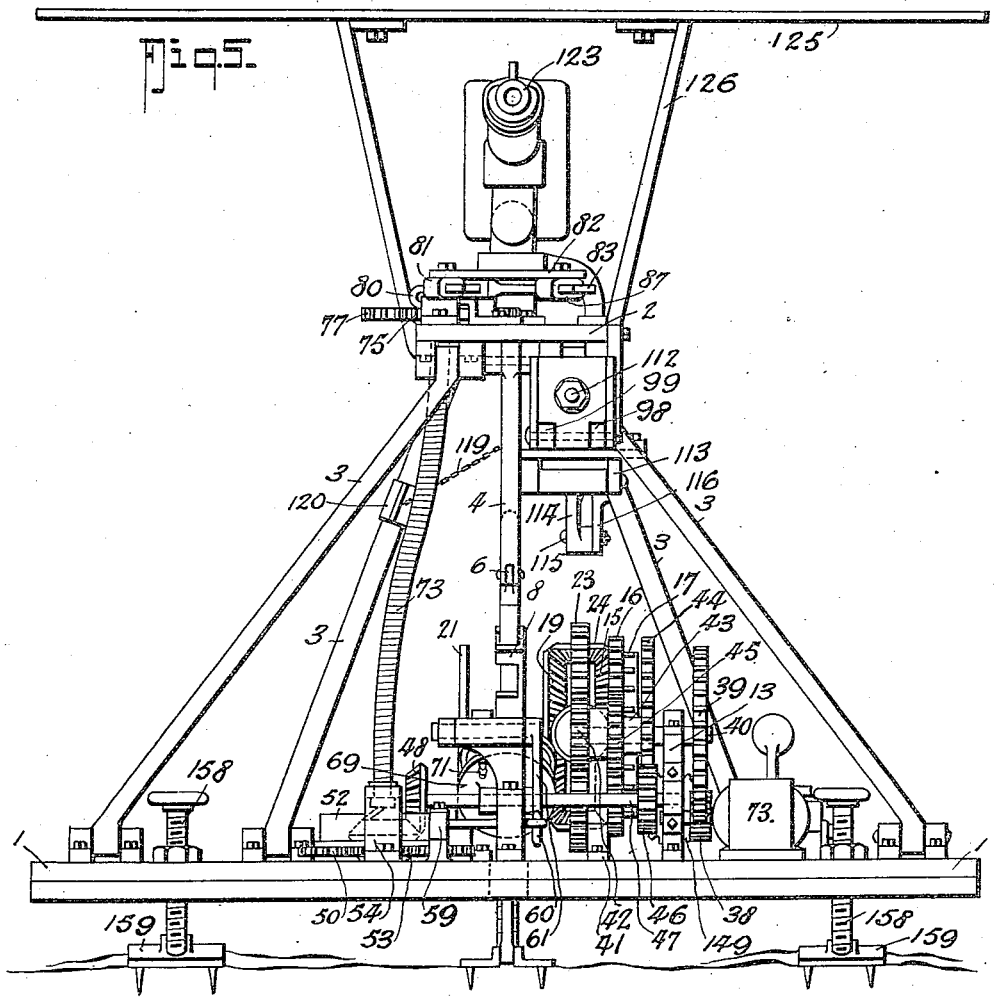
INVENTOR
A. B. Knotts.
BY
Fred G. Dieterich
ATTORNEYS A. B. KNOTTS.
MEANS FOR OPERATING MACHINE GUNS.
APPLICATION FILED FEB. 1, 1916.
1,198,557.
Patented Sept. 19, 1916.
15 SHEETS—SHEET 5.
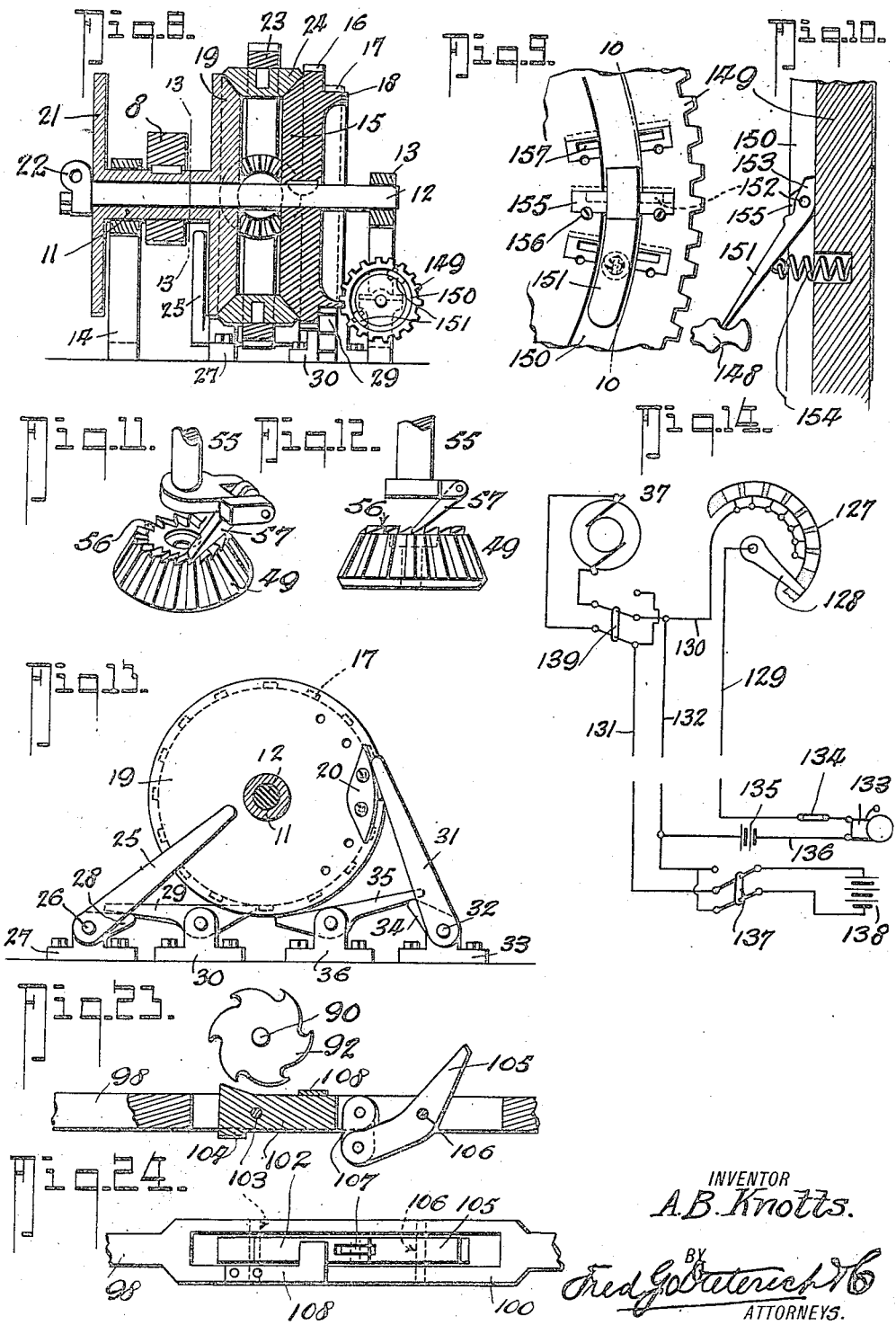
INVENTOR
A. B. Knotts.
BY
Fred G. Dieterich
ATTORNEYS.

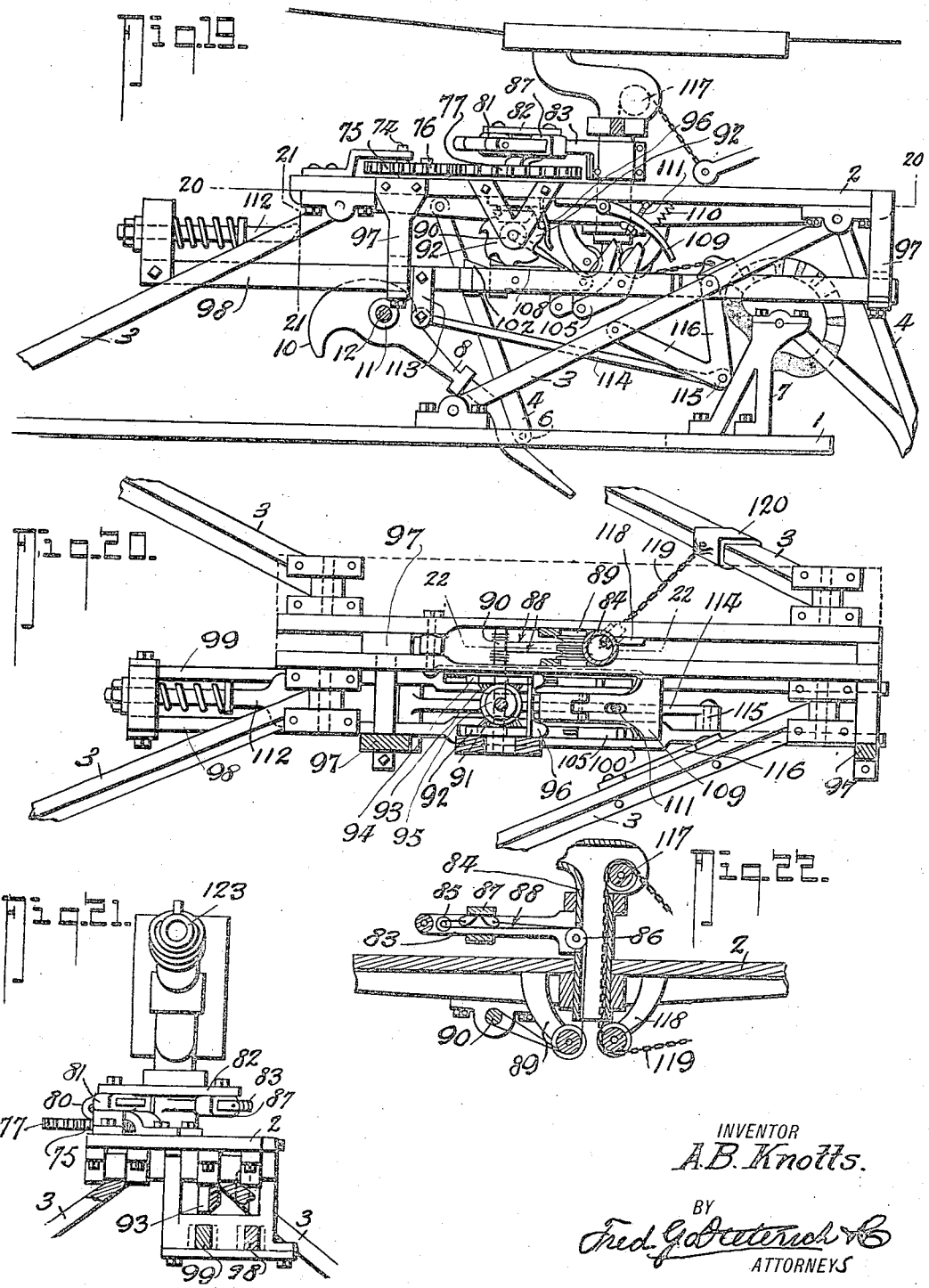

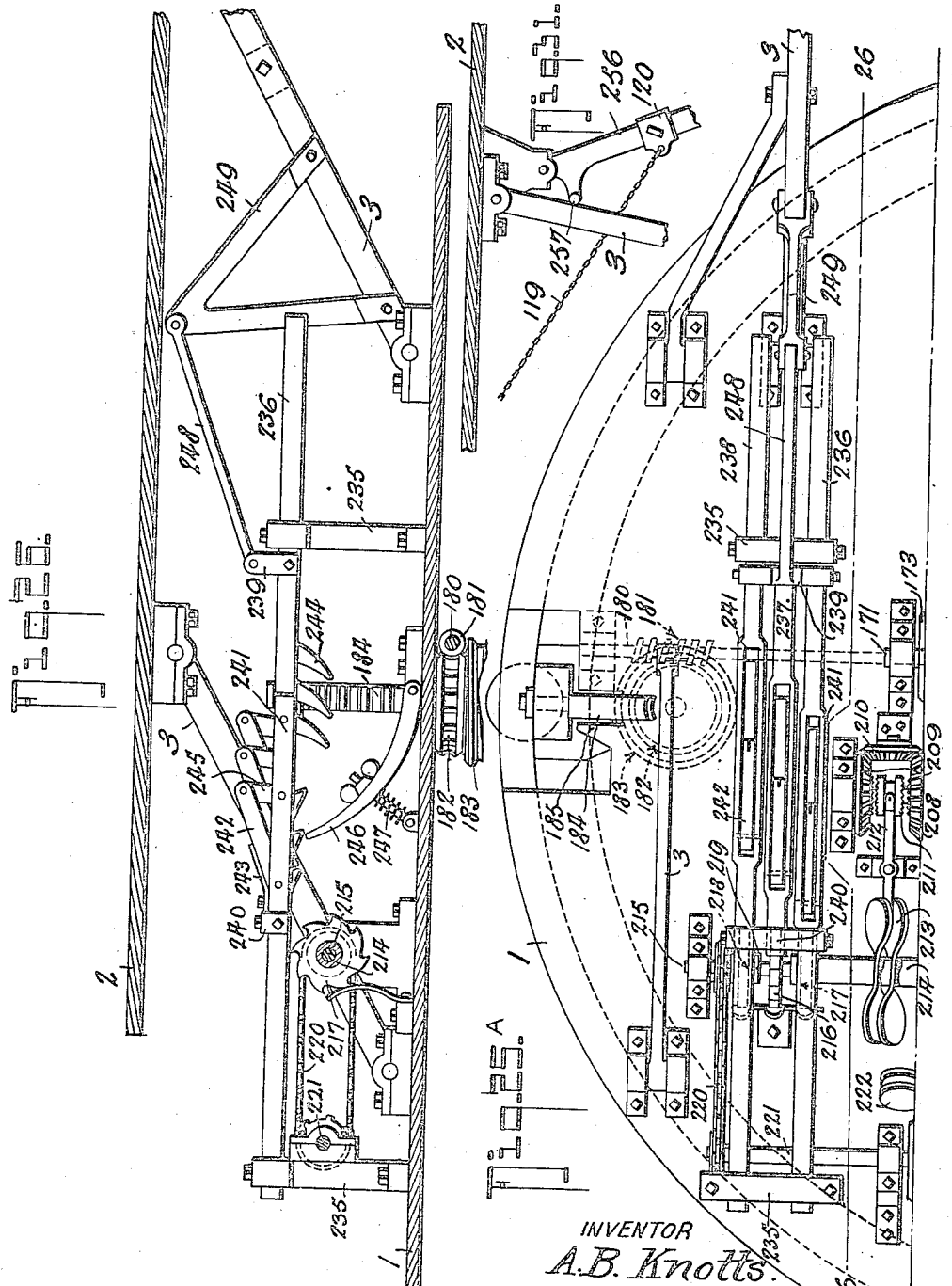

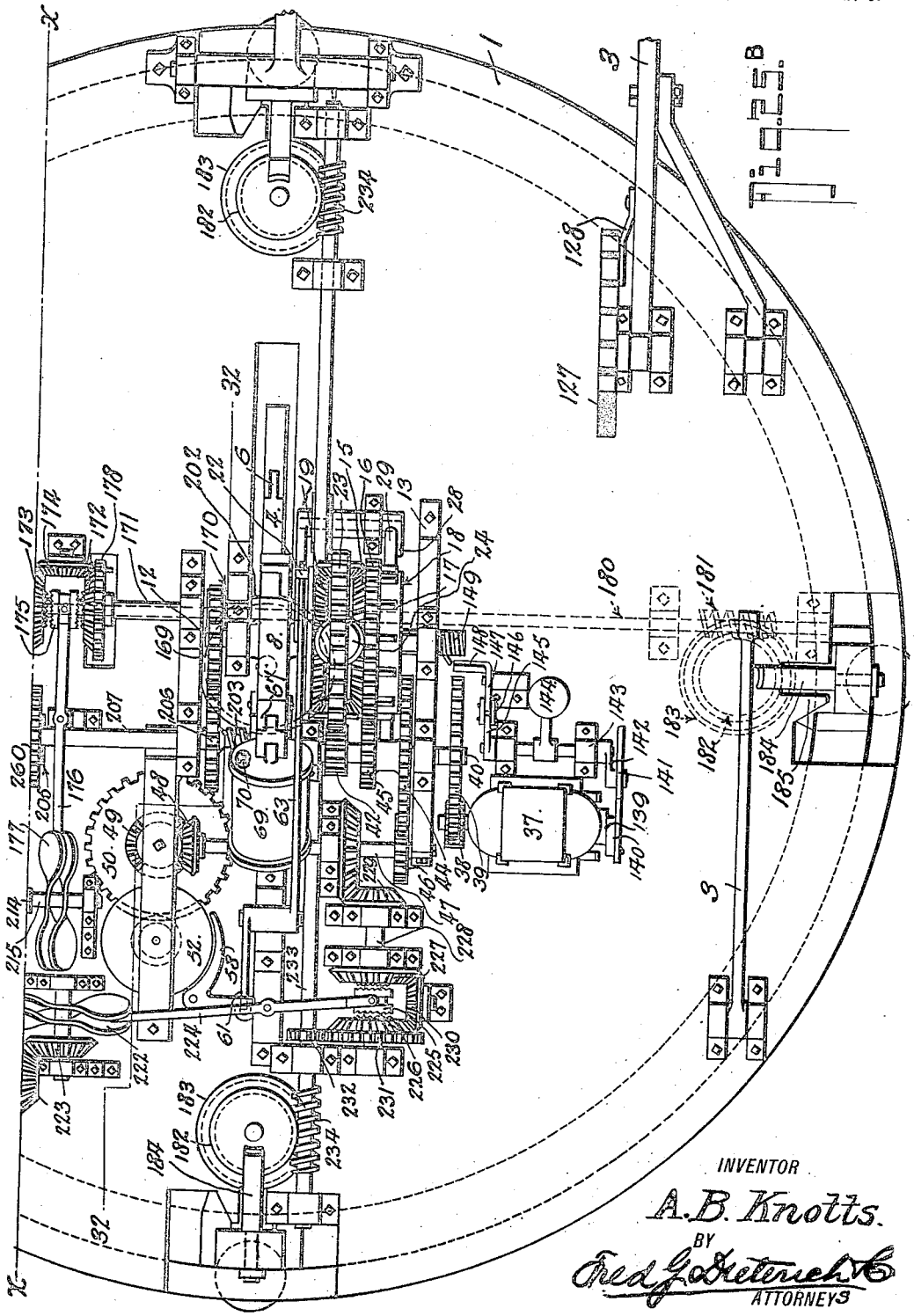

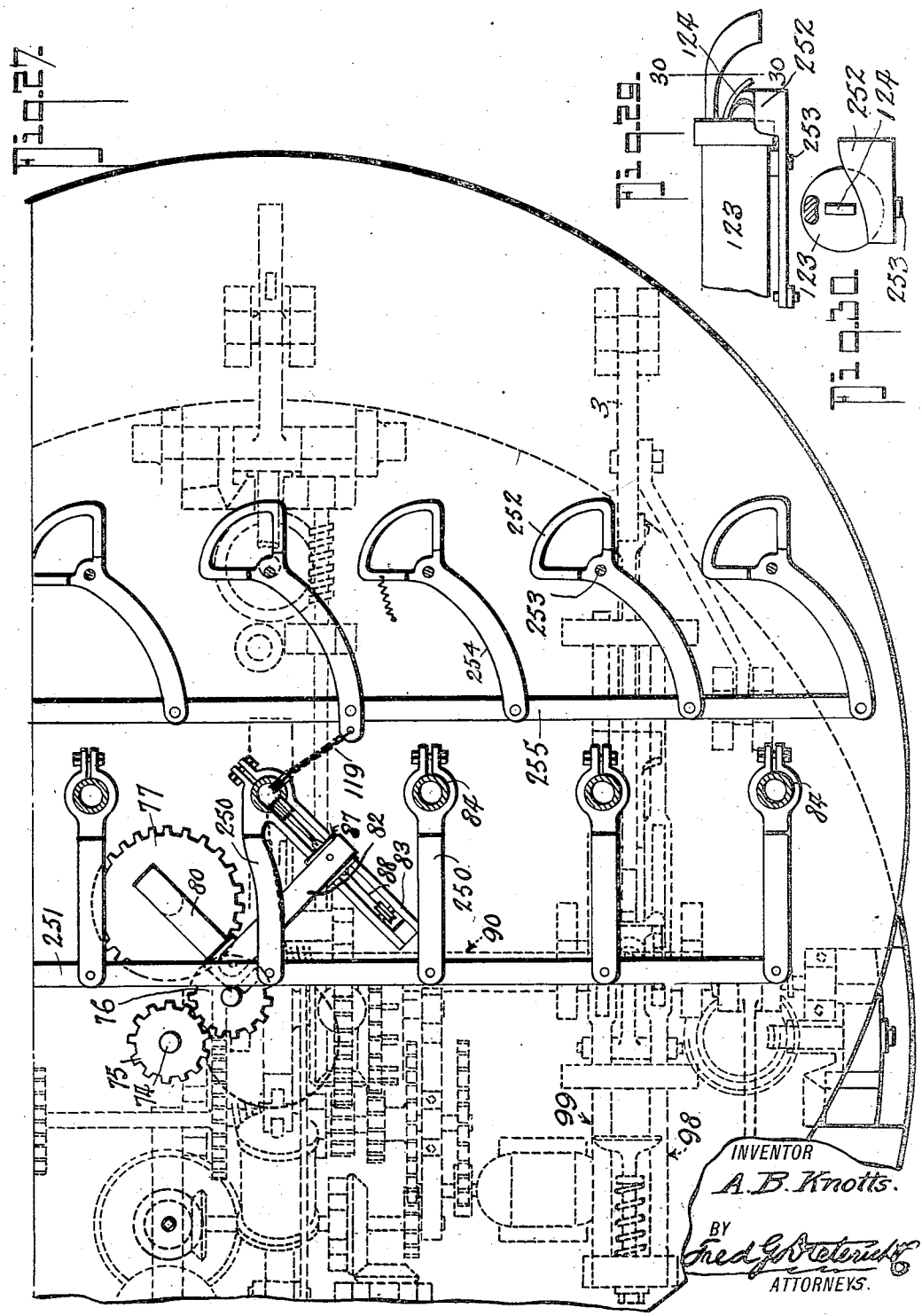

A. B. KNOTTS.
MEANS FOR OPERATING MACHINE GUNS.
APPLICATION FILED FEB. 1, 1916.
1,198,557.
Patented Sept. 19, 1916.
15 SHEETS—SHEET 10.
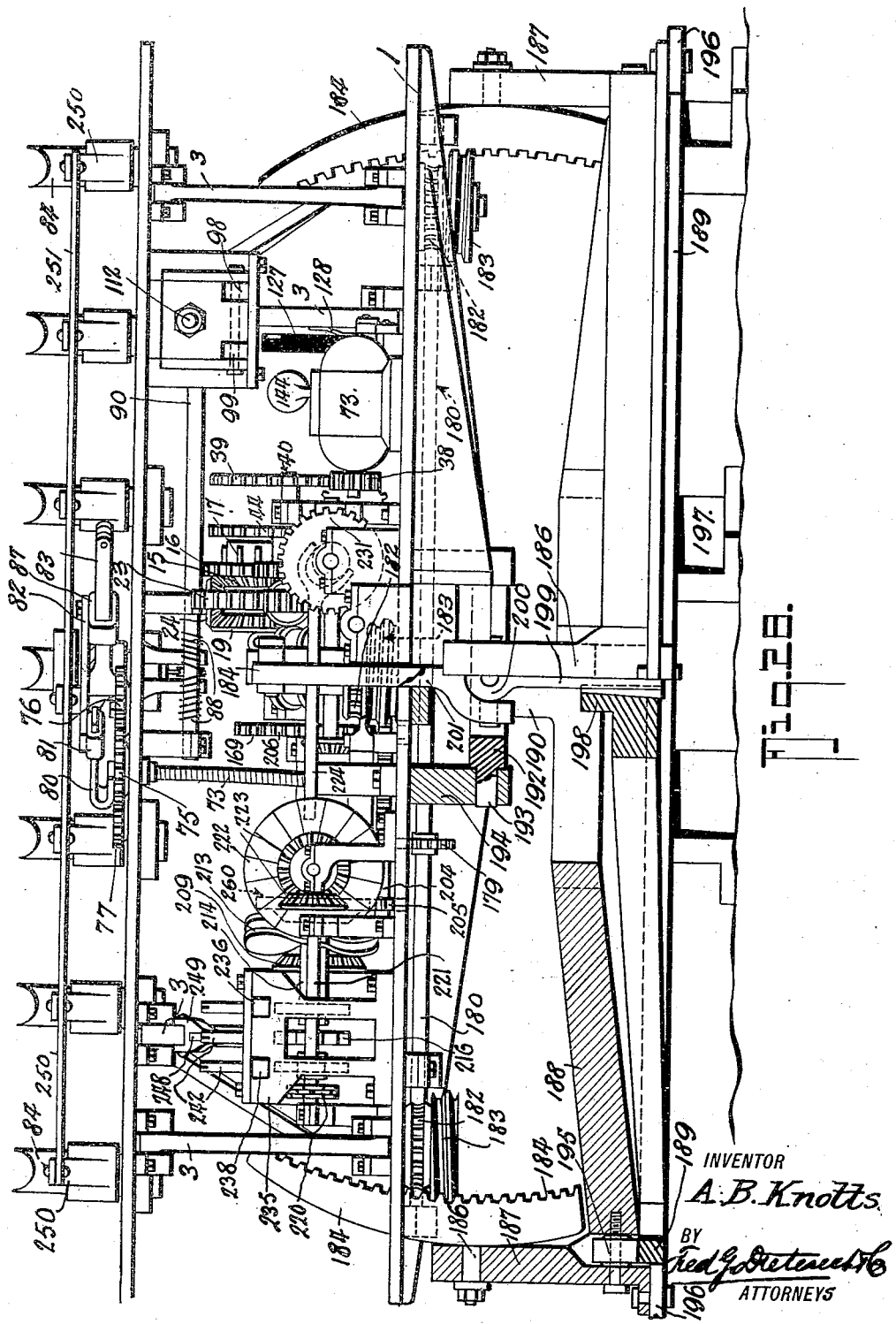
INVENTOR
A. B. Knotts
BY
*Fred G. Dieterich*
ATTORNEYS

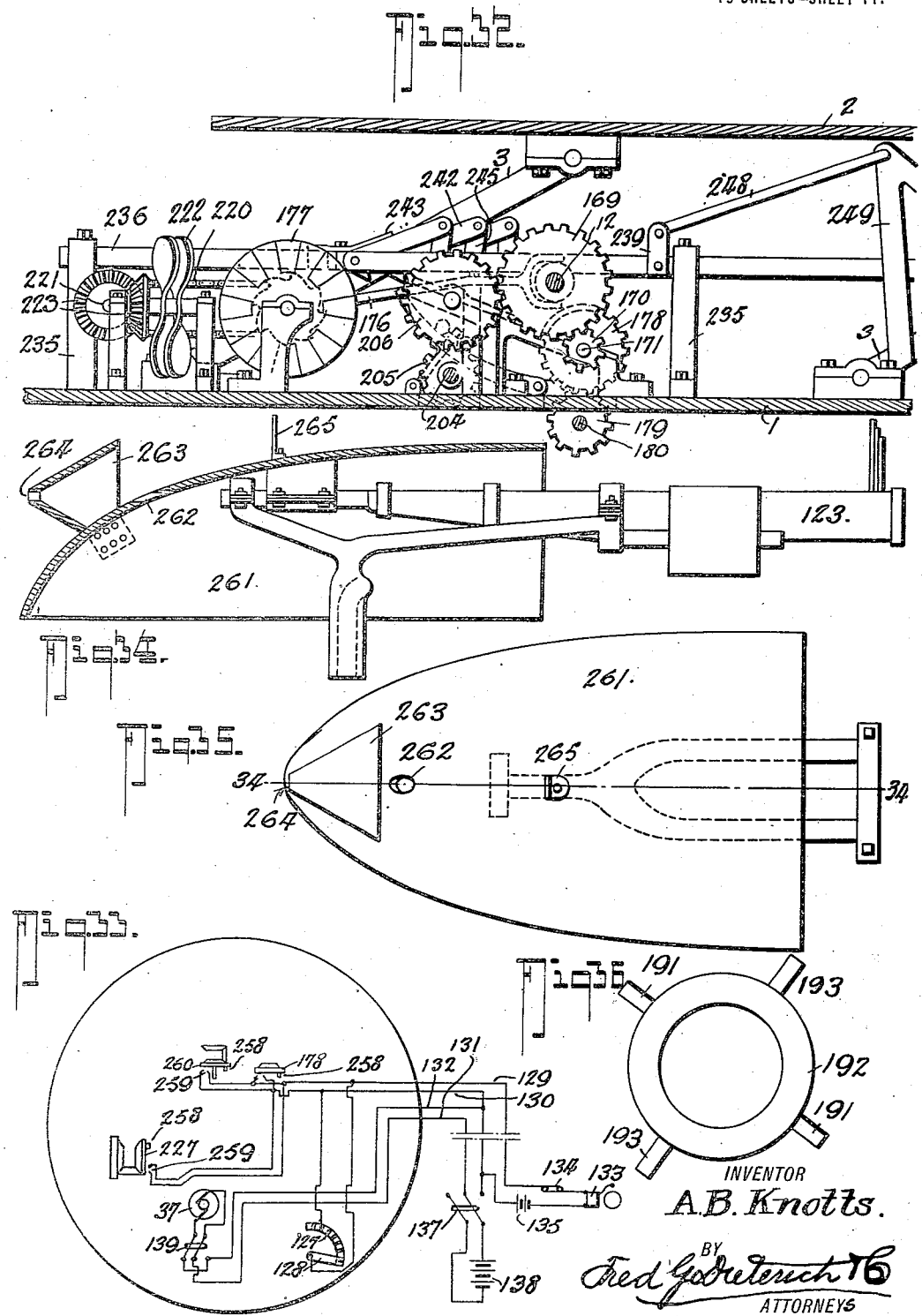

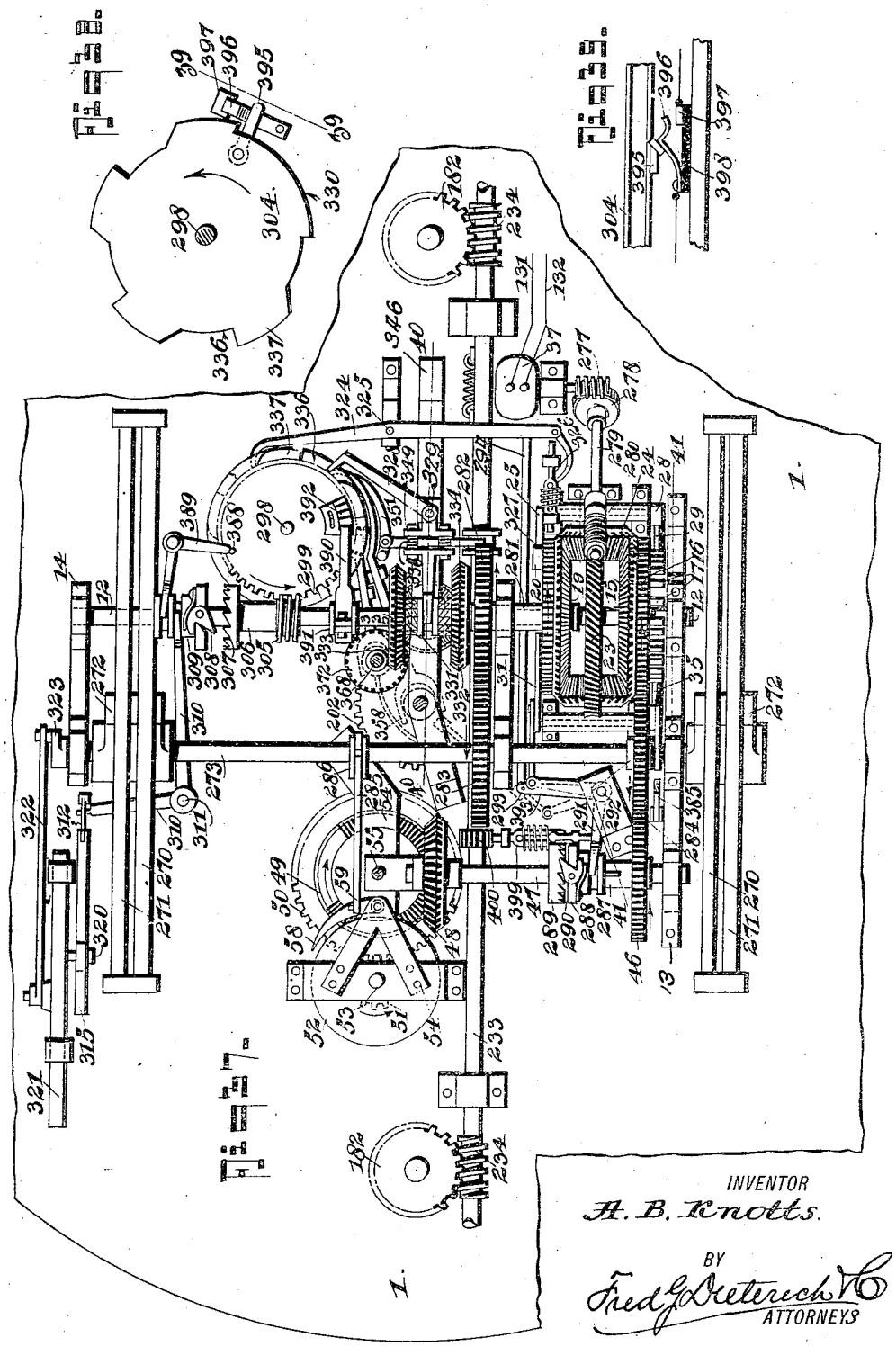

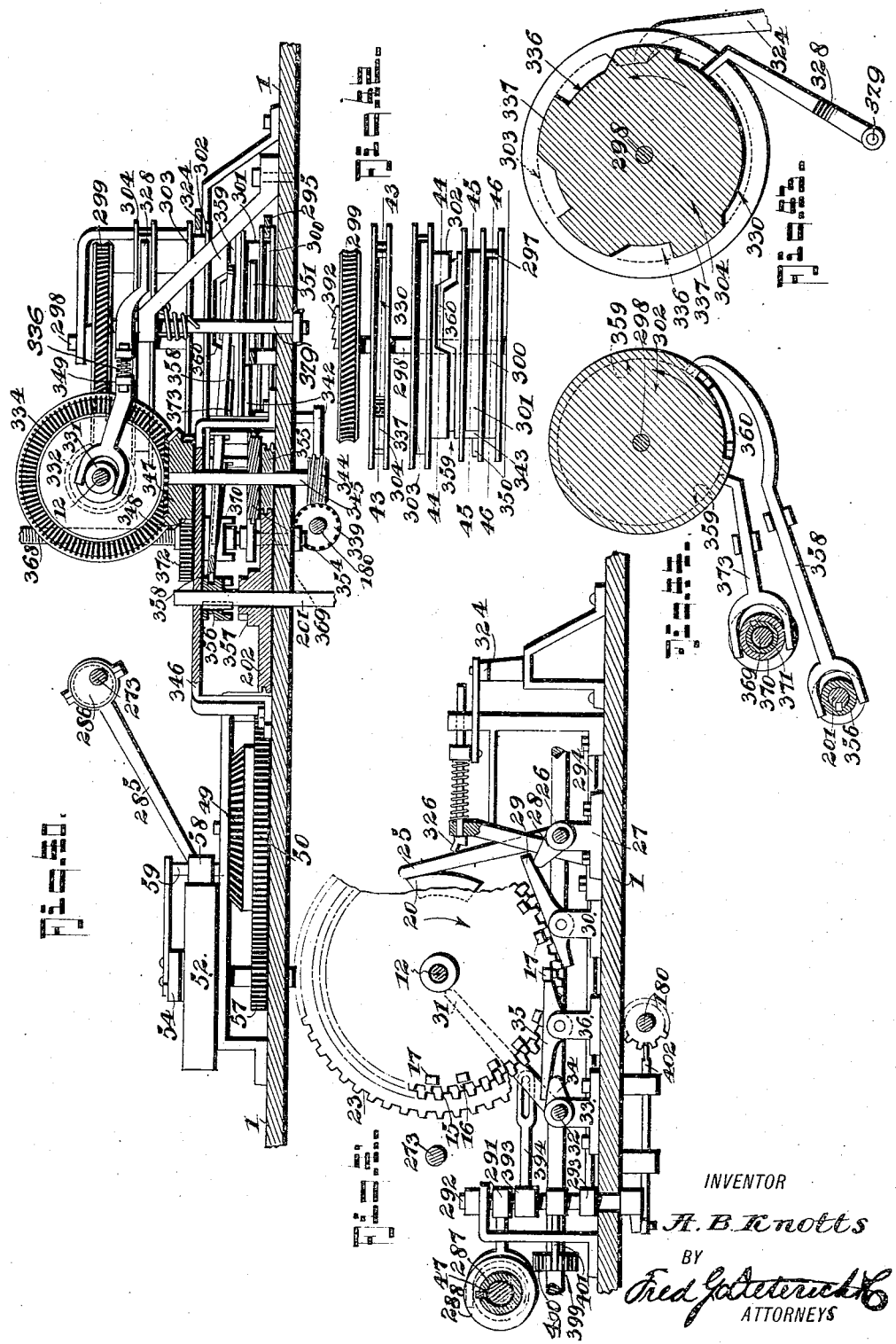

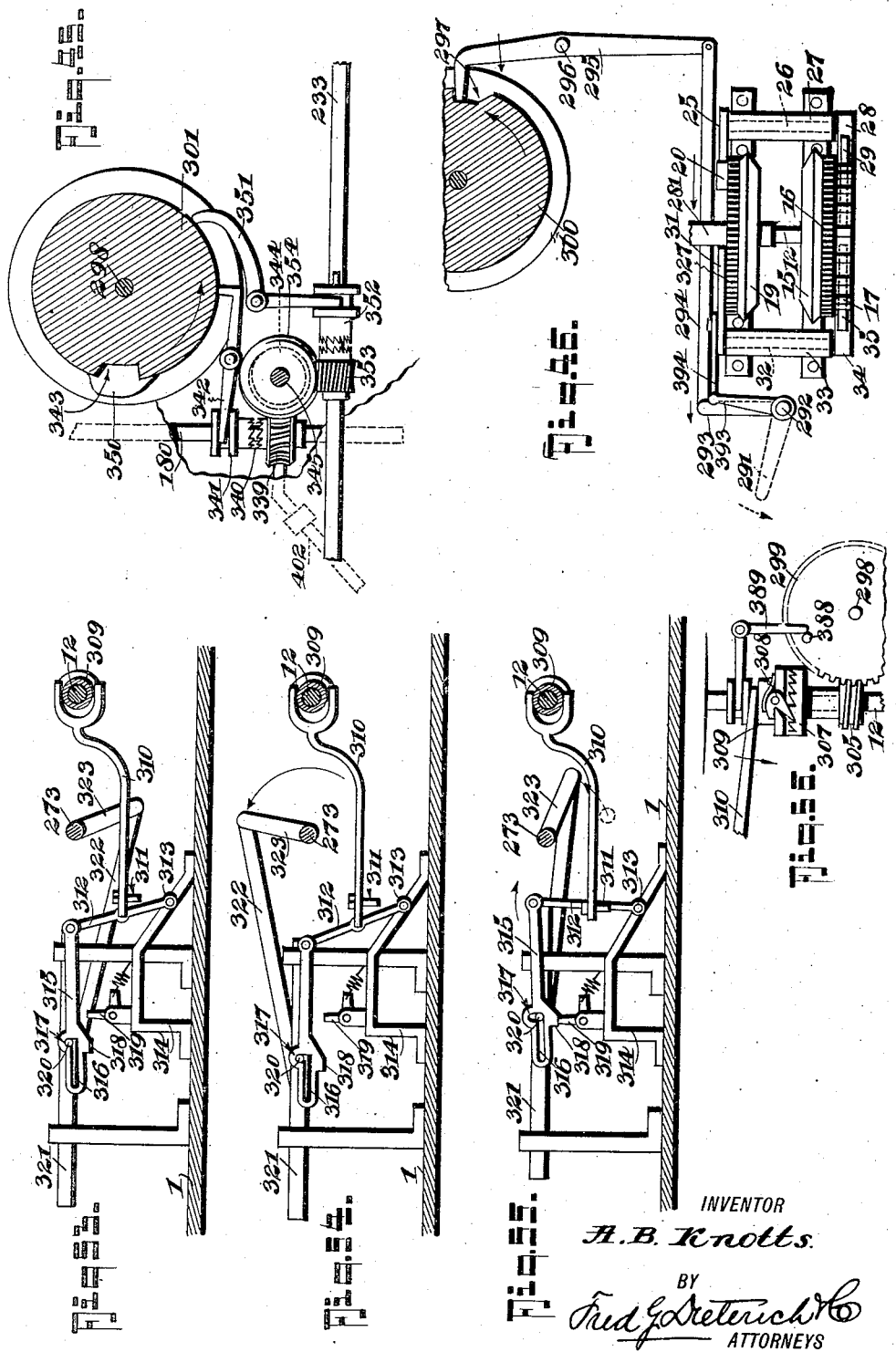

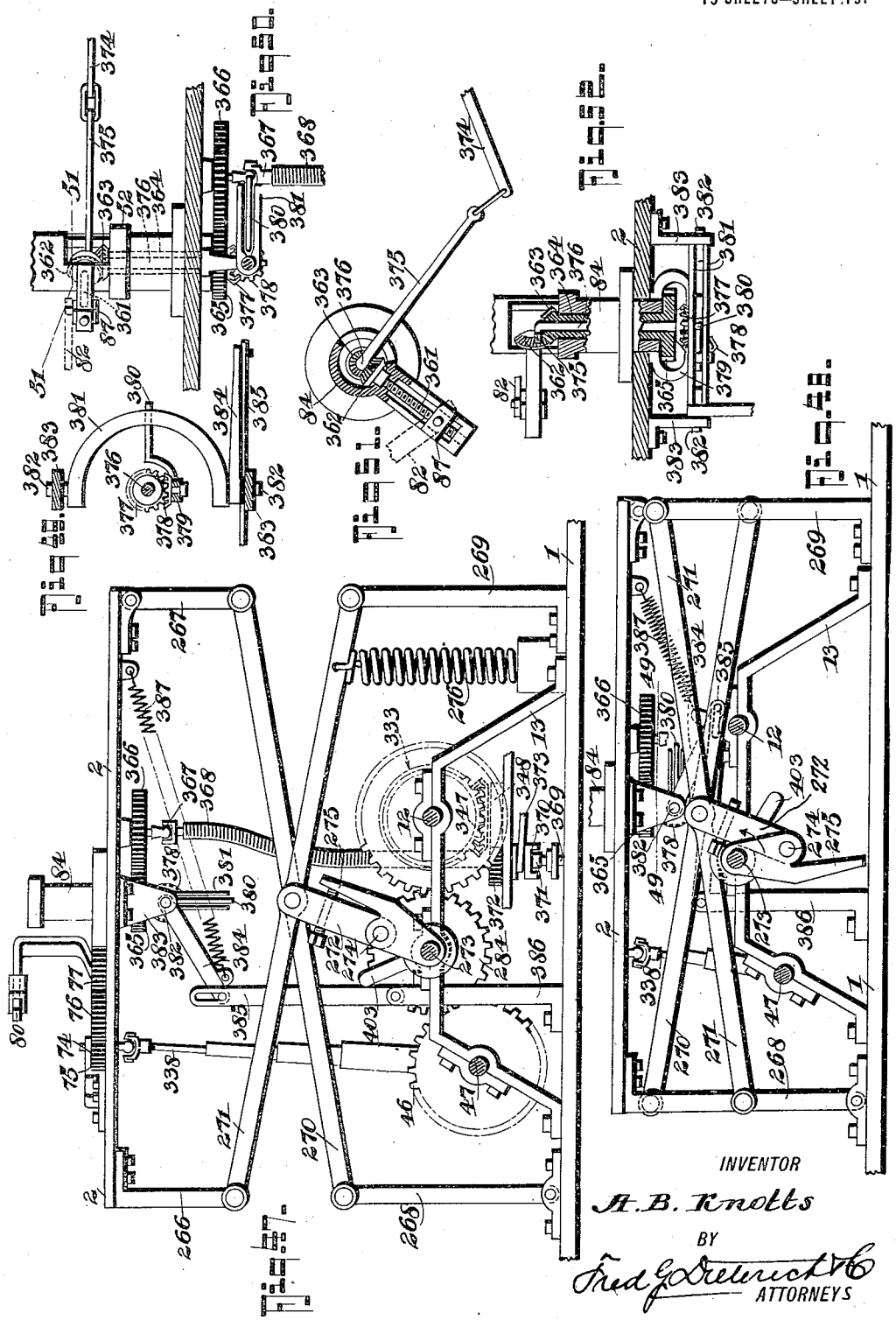

UNITED STATES PATENT OFFICE.

ADDISON BURGESS KNOTTS, OF RAMOS, LOUISIANA.

MEANS FOR OPERATING MACHINE-GUNS.

1,198,557. Specification of Letters Patent. Patented Sept. 19, 1916.

Application filed February 1, 1916. Serial No. 75,595.

*To all whom it may concern:*

Be it known that I, ADDISON B. KNOTTS, a citizen of the United States, residing at Ramos, in the parish of St. Mary and State of Louisiana, have invented a new and Improved Means for Operating Machine-Guns, of which the following is a specification.

The invention primarily has for its object to provide means for concealing machine guns and operating them from a distance. In order that this may be accomplished, the gun is located in a pit and is mounted on a bed that is normally held in a lowered position to conceal the gun below the bank of the pit, there being mechanism provided whereby the bed may be released and elevated to bring the gun above the bank of the pit when desired.

The invention further provides mechanism for automatically actuating the firing trigger of the gun and mechanism for automatically oscillating the gun in a horizontal plane to sweep the horizon through a predetermined angle.

In addition to the foregoing, mechanism is also provided whereby the degree of oscillation of the gun may be adjusted means whereby the base may be turned about a vertical axis or tilted up and down, forwardly and backwardly and sidewise, etc., in order to change the setting or "training" of the gun, such mechanisms being preferably operatively controlled at a distant place.

The invention in its general nature comprises a gun carriage of the concealed type having motor operated devices for raising the gun to the firing position, and mechanically operated devices for oscillating the gun when raised, instrumentalities for adjusting the oscillating mechanism to vary the degree of oscillation, mechanism for releasing the firing trigger at the proper time and mechanism for tilting and rotating the base to change the position of the gun with relation to the object or objects fired upon, the several parts being operatively controlled by instrumentalities under the direction of an operator who may be located at a distance from the gun bed and may operate several guns, if desired.

In its more subordinate features the invention includes those novel details of construction, combination and arrangement of parts, all of which will be first fully described, then be specifically pointed out in the appended claims, and illustrated in the accompanying drawings, in which:—

Figure 1 is a side elevation of one form of the invention, the mechanism for varying the degree of oscillation of the gun being omitted to more clearly show the operating parts. Fig. 2 is a top plan view of the structure shown in Fig. 1, the bed, legs and braces being disconnected from the base and removed. Fig. 3 is a section taken substantially on the line 3—3 of Fig. 2, with the bed and the parts carried thereby in the elevated or firing position. Fig. 4 is a detail section and elevation showing the dash-pot brake devices for cushioning the movements of the bed. Fig. 5 is a front elevation with the parts in the position shown in Fig. 3. Fig. 6 is a detail plan view of the bed, the gun pivot post being shown in horizontal section. Fig. 7 is a detail central section of the double gears that transmit power to the governor driving shaft from one of the differential gears. Fig. 8 is an enlarged detail section on the line 8—8 of Fig. 2. Fig. 9 is an enlarged detail elevation of a portion of the motor reversing or switching gear. Fig. 10 is a detail section on the line 10—10 of Fig. 9. Fig. 11 is a detail perspective view of the pawl and ratchet driving connection between the governor and the flexible transmission shaft. Fig. 12 is a side elevation of the parts shown in Fig. 11. Fig. 13 is an enlarged elevation showing the latches, their releasing levers and the releasing knob on one of the differential gears. Fig. 14 is a diagrammatic view of one arrangement of electric circuits for power and signaling purposes. Fig. 15 is a detail elevation showing the modified trigger operating arrangement. Fig. 16 is a detail plan view of a further modification of gun firing mechanism. Fig. 17 is a side elevation of the parts shown in Fig. 16. Fig. 18 is a side elevation showing a further modification of the devices for operating the gun firing mechanism. Fig. 19 is a side elevation of the bed and a portion of the base structure, legs and braces, etc., illustrating the mechanism for varying the degree of oscillation of the gun, parts of the bed elevating and operating mechanism being omitted for clearness of illustration. Fig. 20 is a horizontal section on the line 20—20 of Fig. 19. Fig. 21 is a detail section on the line 21—21 of Fig. 19. Fig. 22 is a detail vertical section on substantially the line 22—22 of Fig. 20, the gun pivot arm being moved into the central, vertical, longitudinal plane, for purposes of illustration, and the gearing on the top of the bed, etc., being omitted to more clearly illustrate the parts shown. Fig. 23 is an enlarged detail elevation and part section of one of the drum shifting ratchets, the pawl and release dog coöperative therewith and a portion of the operating slide bar. Fig. 24 is a top plan view of the parts shown in Fig. 23. Figs. 25$^A$ and 25$^B$ constitute a plan view of the adjustable base, the bed and the parts attached thereto having been removed. Fig. 26 is a cross section on the line 26—26 of Fig. 25$^A$, a portion of the bed being shown. Fig. 27 is a plan view of a portion of the bed, the gun being removed and the gun pivots being shown in horizontal section, the trigger operating segment arms being shown in plan, and parts of the structure beneath being indicated in dotted lines to show the relative positions. Fig. 28 is a front elevation of the structure, one half of the foundation structure being shown in central vertical section. Fig. 29 is a detail side elevation showing the manner of mounting the trigger operating cam segments on the gun. Fig. 30 is a section on the line 30—30 of Fig. 29. Fig. 31 is a detail view of the mechanism for operating the trigger releasing chain. Fig. 32 is a detail section on the line 32—32 of Fig. 25$^B$. Fig. 33 is a diagrammatic view of signaling and operating circuits that may be employed. Fig. 34 is a vertical section on the line 34—34 of Fig. 35, illustrating a shield for the gun. Fig. 35 is a top plan view of the shield structure. Fig. 36 is a detail view of the universal ring. Fig. 37 is a plan view of a portion of the device showing a modified construction in gear operating and gun elevating mechanism, parts of the coöperating mechanism being omitted. Fig. 38 is a detail view of the signal circuit closing device shown attached to one of the cam disks. Fig. 39 is a detail view thereof being viewed from a plane on the line 39—39 in Fig. 38. Fig. 40 is a cross section on the line 40—40 on Fig. 37. Fig. 41 is a detail section on the line 41—41 on Fig. 37, parts being omitted. Fig. 42 is a detail elevation of the superimposed cam disks hereinafter to be described. Fig. 43 is a cross section on the line 43—43 on Fig. 42. Fig. 44 is a cross section on the line 44—44 on Fig. 42, showing certain ones of the clutch shifting levers. Fig. 45 is a cross section on the line 45—45 on Fig. 42 showing the clutches with which the cam levers coöperate. Fig. 46 is a cross section on the line 46—46 on Fig. 42, showing the coöperating lever arm and its coöperating mechanism. Fig 47 is a side elevation showing the gun carrying platform elevated, a modified raising mechanism being illustrated and parts of the mechanism being purposely omitted. Fig. 48 is a side elevation showing the gun carrying platform in its lowered position. Fig. 49 is a detail cross section on the line 49—49 on Fig. 48, illustrating an improved form of trigger operating mechanism. Fig. 50 is a detail side elevation showing the associated parts of the trigger operating mechanism, more clearly. Fig. 51 is a cross section on the line 51—51 on Fig. 50. Fig. 52 is an elevation and part section, other parts being broken away, looking in the direction from right to left in Fig. 50. Fig. 53 is a diagrammatic side elevation showing a modified construction of clutch operating mechanism for the shaft 12, the gun carriage being in the lowered position. Fig. 54 is a similar view, the gun carriage platform being in its raised position. Fig. 55 is a similar view, the gun carriage platform being elevated about one-third of the distance. Fig. 56 is a detail view of the arriving clutch for shaft 12, it being in the position it assumes when the coöperating parts are disposed as in Fig. 55.

In the drawings, in which like numerals of reference indicate like parts in all of the figures, 1 represents the base, and 2 designates the bed. The base and bed are connected together for parallel motion of the bed toward and from the base by legs 3 which are hinged to the base and bed and by braces 4 which have hinged joints 6 capable of breaking or opening in one direction only, the front and back braces 4 being coupled together by a connecting rod 5 (see Fig. 1). The back brace 4 is pivotally mounted in a bearing 7 while the front brace 4 is mounted on the arm 8 that is carried by a sleeve 11 which is journaled on the shaft 12, the arm 8 having cam surfaces 9—10 respectively to engage with the buffer brake device 67 hereinafter referred to. The shaft 12 is mounted in a bearing 13 and extends into the sleeve 11, which sleeve is itself journaled in a bearing 14. This serves to sustain the shaft 11 and the sleeve 12 that runs on it.

15 is a beveled gear which also has a spur gear face 16 and a toothed portion 17, the latter coöperating with the holding dogs 29 and 35, hereinafter again referred to. The composite gear 15—16 is keyed or otherwise secured to turn with the shaft 12. The composite gear is also provided with an annular worm 18 that drives the reversing switch operating gear 149, hereinafter again referred to (see Fig. 8).

19 is a beveled gear which faces the gear 15 and is carried by the sleeve 11 to turn loosely on the shaft 12 and the beveled gears 15 and 19 mesh with pinions 24 carried by the ring gear 23, the latter forming the driving gear of the differential set of gears, as best illustrated in Fig. 8 of the drawings.

The composite gear 15—16 etc., is held from turning in either direction by one or another of the dogs 29 and 35. The dogs 29 and 35 are respectively mounted in bearings 30 and 36 and are designed to be released by the short lever members 28 and 34 respectively that are carried on the shafts 26 and 32 respectively and are operated by the long levers 25 and 31. The shafts 26 and 32 are respectively mounted in bearings 27 and 33 and each lever 25 and 31 is designed to be engaged, at one time or another, by an adjustable knob or block 20 which is secured in a predetermined position on the back of the gear 19 (see Fig. 13). The dog 29 is normally in engagement with one of the stop lugs 17 when the bed is in the lowered position (see Fig. 13), while the knob 20 engages the lever 31 and holds the dog 35 out of engagement at this time, thus leaving the gear 19 free to turn in one direction only, it being understood that the levers 25 and 31 and dogs 29 and 35 are provided with means to cause them to assume the position shown at the left of Fig. 13, when the long levers are not engaged by the knob 20. This may be accomplished by weighting such levers or dogs or providing springs, as may be found convenient.

37 is the driving motor which as shown is preferably an electric motor and it has its driving pinion 38 designed to engage the master gear 39 that is keyed or otherwise secured to the shaft 40, the shaft 40 projecting through a bearing in the bearing frame 13 and also journaled in a bearing 41. The shaft 40 also carries a pinion 42 that is fixed to the shaft and meshes with the ring gear 23 of the differential mechanism.

43 is the sleeve of a double gear 44—45 that is journaled loosely on the shaft 40, the master gear 44 of the double gear meshing with the pinion 46 on the driving shaft 47 of the governor mechanism from which the oscillating mechanism is also driven while the gear 45 meshes with the gear portion 16 of the composite gear 15—16.

48 is the driving gear—which meshes with the gear 49 on the stub shaft of the gear 50, the latter gear meshing with the pinion 51 on the governor shaft 53 on which shaft the brake drum 52 is also mounted.

54 is a bearing frame in which the shaft 53 is journaled and in which the drive shaft stub 55 is also journaled. The shaft 55 carries a pawl 57 which engages a ratchet 56 on the gear 49, see Figs. 11 and 12, so that the shaft 55 will be turned in one direction only as the gear 49 is turned in the corresponding direction, for purposes which will be later apparent.

58 is the brake which is pivoted at 59 and is linked at 60 with the arm 61 that is mounted on the shaft 62 to which the brake operating lever 63 is also fastened, the lever 63 passing through a swivel block 22 that may be fastened to a disk 21 on the sleeve 11, or in any other desired way driven by the sleeve 11 whereby the brake will be applied to the fly wheel drum 52, when the bed is elevated, to a predetermined degree to render the oscillation of the gun uniform.

By reference to Fig. 4, the construction of the checking brake mechanism will be best understood. In order to check the movements of the bed or dampen the same, as the bed approaches either the lowered or raised position, I provide the mechanism referred to. This mechanism consists of a bell crank lever pivoted at 65 with its long arm 64 extended upwardly and carrying a brake shoe 67 that is designed to engage the cam surfaces 9 and 10 of the arm 8, the engagement being effected by a dash-pot, the piston rod 68 of which is connected to the lever 64 and spring-pressed outwardly, air cushions being formed in either end of the cylinder 69, the effective action of which is regulated by escape cocks 70. In order to prevent the shoe 67 sticking to the cam surface 10, when the bed is in the lowered position, I provide a special mechanism for disengaging the shoe at that time. This mechanism comprises a rocking lever 71 fulcrumed at 72 and designed to underlie the short arm 66 of the bell crank lever whereby when the arm 8 assumes the lowered position (see dotted lines, Fig. 4) the lever 71 will be raised to tilt the bell crank lever 64 a little farther than is done by the cam 10 and thus a disengagement of the shoe 67 is positively effected.

73 is a flexible drive shaft which transmits the power from the governor stub shaft 55 to the driving gear 75 of the gun oscillating mechanism. The shaft 73 may be of any construction, and I have therefore made no detailed disclosure of the construction of the same.

The gear 75 is mounted on the bed and meshes with an intermediate gear 76 that in turn meshes with the master gear 77 which is carried by the shaft 78 that is journaled in the bed 2 and in a bearing bracket 79 (see Fig. 1).

80 is an arm that turns with gear 77 and on which a block 81 is adjustably mounted so as to be capable of being set closer to or farther from the axis of the gear 77. The block 81 is linked at 82 to a shiftable block 87 on the channeled arm 83, the arm 83 is clamped to the pivot stub 84 of the gun so as to turn the same, and the block 87 is shifted toward or from the pivotal axis of the gun by a wire or cable device, best shown in Figs. 6, 20 and 22 of the drawings, by reference to which it will be seen that cables 88 are wound in reverse directions on the drum shaft 90 and pass over idlers 89 thence up through the tubular pivot stub 84 and over other idlers 86—85 and have their ends connected to opposite sides of the block 87 whereby as the drum shaft 90 is turned in one direction or the other, the block 87 will be moved outwardly or inwardly accordingly, as will be hereinafter more clearly explained.

The mechanism by which the shaft 90 is turned is best shown in Figs. 19 to 21, inclusive of the drawings, by reference to which it will be noticed that the shaft 90 is journaled in suitable bearings and is located beneath the bed 2. It carries a ratchet 92 having a predetermined number of teeth (seven being the predetermined number in the drawing) the ratchet 92 having a beveled gear portion 91 and is fixedly secured to the shaft 90. A second ratchet 94 having a corresponding number of teeth and a beveled gear 93 is loosely mounted on the shaft 90, the bevel gears 91 and 93 being joined by a beveled gear 95 which is relatively fixedly located on a stub beneath the bed whereby as one of the ratchets 92 or 94 is turned in one direction, the other will be turned in the opposite direction.

96 is a spring brake which is designed to engage one or both of the ratchets 92 or 94 to hold the shaft 90 from accidentally turning.

Mounted in pendent bearings 97 is a pair of operating bars 98—99 for the ratchets 92—94 respectively. As each of the bars 98—99 is of the same construction, save that the pawl and release mechanism of the bar 99 is set one step in advance of the mechanism of the bar 98, the construction of both bars will be best understood by reference to Figs. 23 and 24 of the drawings, from which it will be seen that the said bar has a slotted pawl carrier 100 in which the pawl 102 is pivoted at 103, a stop 104 being provided to limit the elevation of the pawl tooth above the upper face of the bar while a spring 108 continuously tends to hold the pawl 102 down with the pawl tooth projected as shown in Fig. 23.

105 designates the pawl withdrawing dog, the latter being pivoted at 106 in the pawl carrier 100 and linked at 107 to the pawl 102.

In order to operate the dogs 105 on the return stroke of the bars 98—99, I provide a hinged finger 109 pendent beneath the bed and adjustable as to position by a bolt and wing nut 111, the finger 109 being downwardly pressed by a coil spring 110 that is suitably located. The finger 109 projects downwardly beyond the upper end of the dog 105 so that after the dog passes the finger on the forward stroke of the bar, the finger 109 will rock the dog 105 on the return stroke until the tooth of the pawl 102 passes its effective position with relation to the ratchet 92 or 94 with which it coöperates.

In order to hold more positively the shaft 90 from turning when the gun is in the elevated position, I provide a buffer brake 112 that is adapted to engage one or both of the ratchets 92 or 94 (see Fig. 3) when the gun is elevated.

The bars 98—99 are coupled together by the bearing 113 and are reciprocated in harmony with the movements of the bed by a connecting rod 114 that is pivoted at 115 to a bracket 116 carried by one of the legs 3 (see Fig. 19).

117 is an idler carried by the gun pivot over which the trigger operating chain 119 passes, the chain 119 being connected to the trigger operating lever 121, passing downwardly through the tubular stub 84 and over a second idler on a bracket 118, the lower end of the chain 189 being connected to an adjustable collar 120 that is secured to one of the legs 3. The lever 121 is pivoted in a bracket at 122 projecting from the the gun 123 and is designed to engage the trigger 124 to move it to the firing position when the parts are in the position indicated in Fig. 3.

125 is a roof or cover platform that may be supported by standards 126 from the bed 2 to cover the pit in which the gun is placed when lowered, it being understood that the platform 125 may be covered with earth, brush or other material to render the appearance of the surface of the ground uniform and thus conceal the location of the gun.

In order that the operator may be advised of the positions of the bed 2 so that he may effect the timely reversals of the motor current in order to actuate the mechanism which adjusts the amplitude of oscillation of the gun and also in order to advise him of the fact that the gun has been properly elevated, a suitable signaling mechanism should be provided and any approved signaling mechanism for the purpose may be used. For convenience of illustration, I have shown a signaling mechanism which while perhaps not the best type for the purpose, will nevertheless be found available, if desired. This mechanism is diagrammatically illustrated in Fig. 14, by reference to which and to Figs. 3 and 19, the arrangement of the circuits may be understood. I provide a contact arm 127, of fixed location having a set of contacting "points" corresponding in number to the predetermined number of "points" or "stations" through which the bed 2 must pass from the lowered to the elevated position and vice versa. For convenience, I have illustrated the same as constituting seven "positions" or "stations," thus requiring seven contact points on the member 127. These plates or "points" are designed to be engaged by a movable contact 128 that may be mounted on the arm 4, and when the gun is lowered, the movable contact 128 rests on an insulated portion of the member 127 (see Fig. 14). The motor 37 has its terminals connected to the line wires 131—132 either directly or (preferably) through a reversing switch 139 (hereinafter again referred to). The line wires run to where the operator may be located and connect with a circuit opening or closing switch 137 that is connected with the source of energy 138 that is used to drive the motor. The contact points of the member 127 are electrically connected together and by a wire 130 may be connected to one of the motor line wires 132 which in this instance is used as the return for the current from the signaling battery 135 at the operator's station; the battery 135 being connected at 136 with a suitable signal 133 that is in turn connected through the switch 134 and signaling wire 129 with the contact 128 on the arm 4.

In order that the bed 2 may be automatically lowered after it has been elevated a predetermined time (say, after the gun has fired its full quota of ammunition) I have provided an automatic reversing switch for the motor. The switch 139 *per se*, may be of any of the usual motor reversing switch types, the operating lever 140 of which is moved from one position to the other by a slotted arm 141 (see Fig. 1) that is thrown by a lever 142 and weight ball 144, the ball being thrown past its dead center by a lever 145 (see Fig. 2) that is linked at 146 with a rocker arm 147, which has a heel 148 that is designed to be engaged by a pawl 151 on the operating gear 149. The construction of the pawl and the manner of mounting it on the gear is best shown by Figs. 9 and 10 of the drawings, by reference to which it will be noticed that the pawl 151 has trunnions 152 mounted in sockets 157 in one face of the gear 149 and held in place by beveled plates 155 and set screws 156 so that the pawl 151 may be located at any desired place within the peripheral groove 150 in the face of the gear 149. The pawl 151 has a heel 153 to limit its outward movement and it is pushed out by a spring 154. If desired, two pawls 151 may be employed (see Fig. 8) so as to automatically reverse the motor current periodically whereby the mechanism can be so set that the gun will fire after a certain length of time, then recede, remain receded for a certain length of time and again be elevated to continue firing, etc. This is advantageous where the gun is of a type in which the barrel is apt to become over-heated by too continuous firing.

The base 1 may be provided with leveling screws 158 and spiked plates 159 with which the screws engage, the plates 159 being flexibly and pendently secured beneath the base 1 by links 160.

So far as described the manner in which the foregoing structure operates is as follows: Assume the parts to be positioned as shown in Fig. 1 of the drawings, the mechanism having been located in a proper pit, the gun magazine properly charged with ammunition and the parts properly set by those whose duty it is to locate the gun in the first place. The gun when located also has its oscillating mechanism set to effect an oscillation through a predetermined angle and it is preferably trained on a predetermined horizontal range to oscillate say between predetermined landmarks. The operator now desiring to set the gun into action closes the switch 137 which permits current to flow to the motor 37 to turn it in a counterclockwise direction in Fig. 1, thus imparting a clockwise motion to the shaft 40, the gear 42 imparting a counterclockwise movement to the ring gear 23 (see Fig. 2). Inasmuch as the dog 29 is in engagement with the stop ratchet 17 (the knob 20 being located on the left hand side of the axis of the shaft 12 in Fig. 2) no movement can be imparted at this time to the bevel gear 15 and hence the shaft 12 does not turn. As the pinions 24 are carried by the ring gear 23 they will ride around the beveled gear 15 somewhat in the nature of planet gears and impart a counterclockwise movement to the gear 19, thus moving the sleeve 11 in a counterclockwise direction and turning the forward arm 4 from the position indicated in Fig. 1 toward the position indicated in Fig. 3. This movement continues until the bed 2 has been completely elevated. Just before the completion of the elevating act, after the knob 20 engages the lever 25, it releases the dog 29, thus freeing the gear 15 to permit it to move in a counterclockwise direction, and thereby impart motion to the gear 45 which in turn imparts motion to the gear 44 that drives the pinion 46 on the shaft 47 and sets the governor mechanism and oscillating mechanism drive shaft into action to impart counterclockwise rotation to the gear 50 in Fig. 2, thus transmitting the motion to the stub 55 and from thence through the flexible driving shaft 73 to the gear train 75, 76 and 77 (see Fig. 6) to turn the arm 80 around the axis of the gear 77. Oscillation of the arm 83 is thereby caused and the gun is caused to oscillate through its predetermined horizontal angle. As the bed 2 reaches the elevated position, the lever 121 will be rocked to cause the trigger 124 to be released and held in the firing position. When the automatic reversing mechanism is employed after the oscillating mechanism has been operated a predetermined time, the finger 151 on the gear 149 will engage the projection 148 and carry it downwardly, thus rocking the ball arm to move the ball past the "dead center" whereupon it falls over to the position opposite that shown in Figs. 1 and 2, and causes the slotted arm 141 to throw the lever 140 of the reversing switch. As this occurs the current will be reversed in the motor and the motor will then be driven in a clockwise direction. It should, of course, be understood that the governor mechanism does not stop instantly, but in view of the fact that the differential mechanism is employed, no sudden stoppage of the parts or breaking of the parts can occur. As soon as the governor drum 52 is stopped, the dog 35 will hold the gear 15—16 against turning in the reverse direction as the motive power is applied to the ring gear 23 to turn it in a clockwise direction in Fig. 1. As the gear 23 is now turning in a clockwise direction and the gear 15—16 is either turning counterclockwise or entirely at rest (as when the momentum of the governor has ceased) the movement of the gear 23 will be transmitted through the pinions 24 to the gear 19 to turn it in the reverse direction, which will cause the arm 4 to be moved from the position shown in Fig. 3 to the position shown in Fig. 1. As the parts approach the position shown in Fig. 1, the knob 20 will engage the lever 31 and release the gear 19. Before this occurs, however, the momentum of the drum 52 will have become *nil* and the continued action of the motor 37 will be transmitted to the gear 15—16 to turn it in a clockwise direction in Fig. 1. After the gear 19 shall have ceased to turn by virtue of the frame 4 having reached the lowered position, the clockwise turning of the gear 19 will drive the gear mechanism in the reverse direction. Inasmuch as, at this time, the brake 58 has been applied, the parts will be slowed down and stopped and then released before the lever 31 shall have been released by the disengagement of the knob 20 permitting gear 15—16 to turn freely in counterclockwise direction, Fig. 13. It is understood that in practice a suitable automatic circuit breaker of the usual type may be employed in the motor circuit to open the circuit when the motor is thus brought to a stop, in the event that the operator fails to effect an opening of the circuit, thereby preventing the motor from burning out. If, however, the reversing mechanism is designed to periodically reverse the gun, that is to say, raise it to operate, then lower it to rest, and vice versa, the employment of the second finger 151 enables the throwing of the weight 244 to the initial position, after the bed has been lowered a predetermined time, by the engagement of the second finger with the underside of the projection 148 during the reverse movement of the gear 15—16, as will be clearly understood by reference to Figs. 2 and 8 of the drawings. When this construction is present the automatic circuit breaker is unnecessary, as the motor circuit is left closed and the motor employed is one such as is designed for sudden reversals of this character.

When the gun is of the style having a trigger located, as shown in Fig. 15, the lever 121 is modified, as will be clear from Fig. 15 of the drawings, and when the gun is of the type employing a rotating firing element (see Figs. 16 and 17) the rotating firing element is provided with a pinion 161 that is turned by a rack 162 on the lever 121 from the inactive to the active position. If the gun is one that operates with a crank, the crank is removed and a sprocket 163 is substituted which is driven by a chain 164 from a sprocket 165 that has a bevel pinion portion 166 which meshes with a bevel gear 167, loosely mounted on the tubular pivot stub of the gun, and having a spur gear portion 168 that meshes with the gear 77, as shown in Fig. 18.

It will be noticed that as the gun is raised, the signal 103 is operated through a successive number of times. Thus, after the operator finds the signal actuated seven times, he knows the gun has been raised the entire distance.

In order to change the angle of oscillation of the gun, the operator throws the switch 137 to energize the motor 37 and listens until the first signal comes in, thus indicating that the gun has reached the first stage or position. When the gun has reached this position, the dog 102 on the bar 98 will be in a position to engage a tooth of the ratchet 92. The operator, by reversing the motor current, at this stage or position, again lowers the bed 2 whereby the dog 102 turns the shaft 90 in a clockwise direction in Fig. 23, one step, thereby moving the block 87 say outwardly a predetermined distance. By repeating this operation a number of times the block may be moved as far as desired, thus decreasing the angle of oscillation of the gun. Should it be desired to increase the angle of oscillation, say the gun is allowed to be elevated to station No. 2, at which position the dog 105 on the bar 98 will have passed the finger 109 while the pawl 102 on the bar 99 will have come into position to engage a tooth of the ratchet 94, by then reversing the motor to lower the bed, the shaft 90 is turned in a counterclockwise direction and the block 87 is moved close to the pivotal axis of the gun. By repeating this operation, *i. e.*—moving the bed to the second stage and reversing the block 87 again to move as close as desired to the axis of the gun, and thereby increase the amplitude of the oscillation, after the oscillating mechanism has been set to the proper predetermined degree, the gun is then elevated to the firing position and operated in the usual manner, as before described.

In Fig. 25ᴬ et seq., I have shown a mechanism whereby, in addition to providing for the operations hereinbefore described, provision is also made for changing the range of the gun, and the sighting of the same, whereby it may be trained on other objects than the object for which the gun was initially set. I accomplish this by mounting the gun (or a battery of guns) on a shiftable base that is itself mounted upon a relatively stationary foundation, mechanism being provided on the base and under control of the operator for tilting the base on a transverse horizontal axis to change the elevation of the gun or battery of guns, and mechanism is also provided whereby the base may be laterally tilted on a longitudinally horizontal axis to aid in training the gun on a predetermined object. Provision is also made for turning the base on a central vertical axis whereby the gun may be trained on a desired object by the distant operator.

The construction of the mechanism for accomplishing the above-named results may be best understood by reference to Figs. 25ᴬ, 25ᴮ, 28 and 27, from which it will be seen that I provide the shaft 12 with an additional gear 169 that is designed to mesh with a gear 170 on a shaft 171, the latter shaft carrying two idle bevel gears 172—173 having opposing clutch faces designed to be engaged by a shiftable clutch 175 that is operated by a lever 176 from an operating cam 177 hereinafter again referred to. The gears 172—173 are permanently connected by a pinion 174 whereby, when rotation is applied to one gear, an opposite rotation will be applied to the other gear, and vice versa. The bevel gear 172 carries a spur gear 178 that is designed to mesh with a pinion 179 on a shaft 180 which is journaled in bearings beneath the body 1 and has worms 181 at its ends that engage worm gears 182 (see Figs. 25ᴬ, 25ᴮ and 28) which worm gears 182 carry worms 183 that mesh with the vertical side rack members 184. The rack members 184 pass through slot guides 185 in the base and are secured at 186 to the standards 187 of the rotatable frame 188 that is mounted to turn on the foundation ring or turntable 189. The frame 188 has standards 190 in which front and back trunnions 191 of the central ring 192 (see Fig. 36), are journaled, the side trunnions 193 of the ring being journaled in the pendent bearings 194 that project downwardly from the base 1. Thus the frame 188 is connected with the base 1 by a universal supporting joint. The frame 188 carries traction rollers 195 and guide rollers 196 that engage the peripheral ring foundation 189, the latter being supported on legs 197, which legs may be provided with leveling screws such as is shown in Fig. 1, for instance, if desired, although in this form of the invention, I believe the use of leveling screws will be found unnecessary. The foundation 189 has a central member 198 in which the stub shaft 199 of a universal joint 200 is fixedly secured, the other stub shaft 201 of the universal joint passing up through the center of the bed 1 and being secured to the central worm gear 202 (see Fig. 25ᴮ). This gear meshes with a worm 203 on a short shaft 204 which carries a pinion 205 that meshes with the gear 260 on the shaft 207 which carries a gear 206. The gear 206 meshes with the gear 169 so as to be driven thereby. The gear 206 is carried on the shaft 207 on which a pair of beveled gears 208—209 having opposing clutch faces are loosely journaled, the gears 208—209 being connected to turn in opposite directions by a pinion 210 of relatively fixed location and each of the gears 208—209 is adapted to be clutched to the shaft 207 by a shiftable clutch element 211 that is operated by a lever 212 governed by a cam 213 on the sleeve 214 which is journaled on the shaft 215 to which shaft the cam 177 is fastened. The shaft 215 carries a toothed disk or ratchet 216 (see Figs. 25ᴬ and 26) and the sleeve 214 has a similar ratchet 217, while a third ratchet 218 is carried by a sleeve 219 that is loose on the shaft 215 and is connected by a suitable power transmission mechanism 220 with the shaft 221 that drives the cam 222 through suitable gearing 223, the cam 222 serving to throw the clutch lever 224 that controls the shiftable clutch element 225 of the lateral tilting gears 226—227. The gears 226—227 are loosely journaled on the shaft 228, which is driven by bevel gears 229 from the shaft 47 (see Fig. 25ᴮ) and the gears 226—227 are caused to reversely turn by an intermeshing pinion 230. The gear 226 also has a spur gear section 231 which meshes with a pinion 232 on the worm shaft 233, the latter shaft having worms 234 that mesh with the front and back worm gears 182; the front and back worm gears like the side worm gears 182 carry worms 183 that mesh with the front and back racks 184, the construction of the parts 182, 183, 184 being the same at all places.

The mechanism by which the cams 177, 213 and 222 are operated is best shown in Figs. 25ᴬ, 26 of the drawings, by reference to which it will be seen that I mount, in suitable bearings 235, the slide bars 236 and 238, to which an intermediate slide bar 237 is secured at 239 and 240. The three bars 236—237—238 have slotted pawl carriers 241, the construction of each of which is the same. In each carrier is mounted a pawl 242 whose tooth normally projects below the bar so as to be in a position to engage the respective ratchet 217—216—218, as the case may be, the pawls being held to their normal position by suitable springs 243. The pawls and ratchets shown in Figs. 25ᴬ and 26 operate on the same principle as the structure shown in Figs. 19 and 20. The pawl 242 in bar 236 is designed to operate to move the ratchet 217 one tooth when the bed is elevated to position #3 and then lowered again, while pawl 242 in bar 237 operates the ratchet 216 one step when position #4 is reached and pawl 242 in bar 238 operates on its ratchet 218 when position #5 is reached and the carriage thereafter lowered, as will hereinafter be more fully described. When the pawls 242 move past their respective operating positions, they are drawn out of action by the dogs 244 which are linked at 245 to the respective pawls 242 and are designed to be operated by a pivoted retriever 246 that is adjustable and held under spring tension by a screw and spring device 247, best shown in Fig. 26 of the drawings, it being understood that when position #3 has been passed the dog 244 in bar 236 will have passed over the retriever 246 so that on the return stroke (lowering of the bed) the pawl 242 in bar 236 will not operate on its ratchet. The bar 236 is reciprocated by being linked at 248 with a bracket 249 that projects from one of the legs 3, preferably the leg at the right hand side of the machine, because the leg at the left hand side is preferably used to operate the oscillation changing mechanism, the construction and operation of which is substantially the same as shown in Figs. 19 and 20, and a further description of the same is thought to be unnecessary. In this form, it will be observed, that the brake bar 63 has its bearing 22 located on the back of the gear 19 instead of on a separate disk 21, as shown in Fig. 8, although it should be understood that either form of construction may be employed as may be found convenient in practice.

When a battery of guns is employed, the several pivots 84 have arms 250 which are connected by a bar 251, whereby when the central gun is turned on its pivot for oscillation purposes the entire battery will be likewise oscillated. When a battery of guns is used, I prefer to employ a trigger operating mechanism as shown in detail in Figs. 29 and 30, by reference to which and to Fig. 27, it will be seen that I provide a cam segment 252 pivoted at 253 beneath each gun and designed to raise the trigger when the segment is turned on its pivot and this is done by having the arms 254 of the segments connected by a bar 255, the bar being longitudinally moved by the chain 119. If desired, the chain 119 may have its connecting block 120 mounted on a pendently pivoted arm 256 (see Fig. 31) that has a heel 257 which may be engaged by one of the legs 3, as the bed reaches the elevated position so that the action on the trigger may not take place until the bed has been completely elevated.

In practice, a suitable signaling mechanism should be provided to indicate to the operator that the shafts 177, 207 and 228 have made the proper number of turns to effect the required number of turns in the worm shafts 180—204—233 respectively, so that the operator may note when the position of the bed has been changed to the desired degree and in the desired manner. Any suitable signaling mechanism for the purpose can be employed and for purposes of illustration, I have disclosed simply an ordinary tap bell signaling system which is diagrammatically shown in Fig. 33, by reference to which it will be seen that the gear 260 may be provided with a contact pin 258 that may engage contacts 259 connected to the signaling circuit wires 129 and 130. The gear 227 is similarly provided with a pin 258 to engage contacts 259 and the gear 178 may also be provided with a contact pin 258 for signaling purposes, it being understood that for every revolution of the respective gears, the respective contact pins will make one engagement with the circuit terminals to close the signaling circuit for each revolution.

In order to operate the gun and adjust it from position to position, the operator should have a chart or field notes to guide him, something similar to the one illustrated below. This chart is preferably prepared by the man who sets the gun and for purposes of illustration let us say that the following is the chart for gun #16.

*Gun No. 16.*
Located 300 ft. from corner of church.

| Landmarks. | Oscillation. | Rotation. | Side elevation. | Fore and aft elevation. |
|---|---|---|---|---|
| School house... | 0 | 0 | 0 | 0 |
| Bridge.......... | −6 | −4 | +7 | +1 |
| Wheat field..... | +2 | −2 | 0 | +3 |
| Hedge fence.... | +4 | +3 | −2 | −2 |

It will be seen that gun No. 16 has been initially set to train its fire on a school house, let us say,—and for this purpose no further adjustment of the gun is required. Supposing that the order comes for the gunner to train the gun to fire say on a certain bridge. He looks on his chart and finds that the oscillation mechanism must be adjusted 6 points in a minus direction, the rotation mechanism 4 points in a minus direction, the side elevation must be changed in a positive direction 7 points and the fore and aft elevation changed one point. The operator thereupon closes the switch to energize the motor 37 and allows the gun to arrive first to position #2 and as soon as the second gong signal has come in, indicating that the bed has been elevated to the second position, he reverses the current to lower the bed. This moves the oscillation adjusting mechanism over in the negative direction one point. He then closes the motor switch to raise the bed again to position #2 and as soon as the signal has come in to indicate the raising act as having been completed to position #2, he again reverses the motor current to lower the bed, thereby moving the oscillation mechanism over a second point in the negative direction. This operation is repeated for six times, thus giving the required oscillation adjustment to the gun. Having adjusted the oscillation mechanism, the operator next adjusts the rotation mechanism and by looking at his chart, he finds rotation must be made in a negative direction four points. He then throws in his motor switch and allows the bed to rise to position #3 and as soon as the signal has indicated the bed as having arrived at this position, he reverses the motor current to lower the bed, thus causing the dog 242 in bar 236 to move ratchet 217 over one tooth and throw the arm 212 out of the neutral position to engage the gear 209, thus imparting motion to gear 208 in the reverse direction and consequently operating screw 203 to turn the bed in the negative direction. The operator permits the motor to run until the contact point on the gear 208 has closed the signaling circuit four times, thus giving four taps to be registered on his signaling bell, and indicating that the desired rotation has been effected, whereupon the operator manipulates the motor current to again raise and lower the bed to restore the clutch to neutral. The next operation is to adjust the tilting mechanism and the chart indicates that the tilting must be in a positive direction seven points. This is accomplished by closing the motor circuit until the bed has been raised to position #4. As soon as position #4 has been reached, the dog 242 in bar 237 is in position to operate on ratchet 216 as the bed is lowered. The operator thereupon reverses the motor current to lower the bed. This turns cam 177 and throws the clutch 175 into mesh with the gear 173. As this would not give the positive rotation to gear 172, the bed must be elevated again to position #4, again reversed and a third time elevated to that position so as to move cam 177 back to neutral and then over to throw the clutch 175 into engagement with gear 172 which causes shaft 180 to turn in the proper direction to operate the side screws 181 and tilt the base sidewise, the motor circuit being left on until the contact pin 258 on the gear 178 shall have closed the signaling circuit seven times, whereupon the current is manipulated to again raise and lower the bed to throw the clutch into neutral and the gun is then adjusted as to the side elevating mechanism. Reference to the chart shows that it is necessary to adjust the fore and aft elevating mechanism one point in a positive direction. This is done by now raising the bed to position #5 and again lowering it to permit dog 242 in bar 238 to act on ratchet 218, thus throwing clutch 235 into mesh with gear 236 to drive shaft 233. The shaft 233 is allowed to be turned until the signal bell has been operated one time, by reason of the contact 258 on gear 227 closing the signaling circuit, whereupon the motor current is manipulated to raise and lower the bed to effect the resetting of the clutch in neutral position. The gun is now adjusted and allowed to be fully elevated and brought into action and at a given order, the operator closes the motor circuit to elevate the bed to the highest position, whereupon the gun will be oscillated and the trigger operated in the manner hereinbefore explained.

I desire it understood that I have shown what I consider a practical operative form of the invention. It is, however, obvious to those skilled in the art that changes in the details of construction, design, construction of parts, etc., will have to be made to suit the requirements of the particular condition met with in practice and I desire it understood that such detailed changes as may be necessary to adapt the invention to the particular uses desired may be made without departing from the spirit of the invention, or the scope of the appended claims.

In Figs. 34 and 35, I have shown a shield 261 that may be attached to the gun to protect it from the enemy's fire, the shield having an opening 262 and being preferably provided with a funnel shaped guard 263 that has a passage 264 in alinement with the opening 262 to permit firing of the gun. The shield 261 is preferably clamped to the gun, although in some instances where guns like the Maxim which have the barrel recoil, the shield should be secured to the frame of the gun and not to the barrel. This, however, is a detail of construction that will be readily adapted by those skilled in the art, to the particular case. The cone part 263 of the shield can be removed and when a battery of guns is used, the shields would, of course, then be quite narrow or else the guns would have to be placed at a considerable distance apart, as will be clear to those skilled in the art. When the shield is employed, the front sight 265 may be set on the shield as indicated in Fig. 34.

In Figs. 37, 47 and 48, I have shown another form of mechanism for raising and lowering the gun carrying platform 2 and this mechanism includes brackets 266 and 267, (see Fig. 47), which are disposed in a downward direction from beneath the platform 2, other brackets 268 and 269 being located beneath the brackets 266 and 267 on the lower or main platform 1. Arranged between the diagonally opposite ends of the aforesaid brackets, which are suitably constructed for the purpose, are arms 270 and 271 which are pivotally secured to the brackets the opposite ends of the arm 270 being fulcrumed on the brackets 268 and 267 while the opposite ends of the arm 271 are fulcrumed on the brackets 266 and 269. It should be understood that a similar arrangement of brackets and arms is provided on the side of the gun platform 2 opposite to that shown in Fig. 47. The crossed bars 270 and 271 are centrally fulcrumed on the wrist pin of each of similarly formed elevating cranks 272 which are mounted on the ends of an elevating shaft 273. The crank 272 is jointed as at 274 and one portion thereof has a laterally disposed heel 275 which engages a suitable abutment screw which is provided in the other portion of the crank, the purpose of these provisions being to strongly brace the crank 272 when the platform 2 is elevated. A tension spring 276 is suitably connected to the arm 271 and is provided to assist the shaft 273 in its elevating function of the platform 2. The spring 276 is, however, not powerful enough to move the arms 271 and 270 independently of the rotation of the shaft 273. As will be observed from Fig. 47, the brackets 267 and 268 are pivotally mounted on their respective supports to allow for any angular displacement of the arms 270 and 271 when they are raised and lowered. The shaft 273 is mounted in the bearing frames 13 and 14 (see Fig. 37) in parallelism with the shaft 12 which is made longer than shown in Fig. 2, for purposes presently to appear.

Let it be assumed that it is desired to elevate the gun platform 2 from the position shown in Fig. 48 to that shown in Fig. 47. The operator, who is located at some distant place, closes the motor switch, causing current to flow from the battery 138, through the wires 131 and 132 (see Fig. 37) to the motor 37. A worm gear 277 is mounted on the shaft of the motor 37 and meshes with a worm pinion 278 which is secured to one end of an obliquely disposed driven shaft 279 which in turn is held in suitable bearing brackets. The turning of the motor shaft thus imparts motion to the shaft 279 and in turn to the ring gear 23 which in this embodiment is a worm gear, a suitable worm pinion 280, also mounted on the shaft 279, being in mesh with the gear 23 and serving to rotate it. Rotation is now imparted to the ring gear 23 in a clockwise direction; the composite gear 15—16 of the differential set of gear hereinbefore referred to, is held from rotating in the clockwise direction since the dog 35 (see Fig. 41) is in engagement with one of the stops of the wheel 17. The pinions 24 will therefore be caused to move over the stationary bevel gear 15 and revolve the bevel gear 19 in a clockwise direction. The gear 19 is mounted on one end of a sleeve 281 a spur gear 282 being located at the opposite end, this gear meshing with a spur gear 283 on the shaft 273; the sleeve 281 is mounted on the shaft 12 and turns independently of the shaft. The gear 283 is rotated in a counterclockwise direction (see arrow Figs. 37 and 48) causing the cranks 272 to move the arms 270 and 271 and elevate the platform 2 in the manner previously explained. The movement of the gear 19 over a certain distance in the clockwise direction (see Fig. 41) causes the block 20 to move from contact with the arm 25 and into engagement with the opposed arm 31, which, upon being turned on its shaft 32 will cause the dog 35 to disengage the wheel 17 which will now allow the gear 16 to rotate in a clockwise direction. The movement of the gear 16 imparts counterclockwise rotation to a gear 284 with which it meshes and which may be loosely mounted on the shaft 273. The gear 284 meshes with the gear 46 on the shaft 47 hereinbefore described, and imparts clockwise rotation thereto as well as to the gears 48, 49 and 50; the brake drum 52 is rotated in a counterclockwise direction as will be seen from Fig. 37. A brake shoe 58 is adapted to engage the face of the brake drum 52 and is actuated by the connected arm 285 of an eccentric 286 which is secured to the shaft 273. When the gun platform 2 is either at the upper or lower extremities of its positions, the brake drum 52 is freed of the shoe 58, but when the arms 270 and 271 are in the act of elevating the platform through the rotation of the shaft 273, the consequent rotation of the eccentric 286 will cause the shoe 58 to engage the drum 52 when the platform has gone approximately one-half of the distance, and cause the momentum of the moving parts to be checked. The further rotation of the eccentric 286 will cause the shoe 58 to disengage the drum 52 by the time the platform has been completely elevated. The gear 46 is not secured to the shaft 47, but is mounted on a sleeve 287 which is in its turn loosely mounted on the shaft 47. The rotation of the gear 46 is imparted to the shaft 47 through a clutch which consists of a member 288 slidably mounted on the sleeve 287, and a member 289 which is keyed to the shaft 47. The member 289 has teeth which are adapted to be engaged by the pawl 290 of the movable member 288. The gun platform 2 is now in the elevated position, as has just been explained, and the gun is rotated on its pivot 84 by the rotation of the shaft 47 which will in turn rotate the stub shaft 55 as has just been pointed out. The rotation of the stub shaft 55 is imparted to the gun rotating mechanism shown in Fig. 6, in this embodiment, by a telescopically arranged shaft 338 which consists of a series of members which fit into the succeeding sections of the shaft so that the platform may be raised and lowered vertically, this arrangement being contradistinctive from the raising mechanism which provided for swinging the platform to its raised position. The dog 290 is moved into engagement with the member 289, by a shifting arm 291 (see Fig. 41). The shaft 292 is provided with an arm 293 disposed at right angles to the arm 291, a rod 294 being joined at one end to the arm 293 and at the other end to a cam arm 295 (see Fig. 46). The cam arm 295 is fulcrumed at 296 and its other end is arranged to engage the surface of a cam disk 300 which, as will be seen from Fig. 42, is the lower one of a bank of cam disks 301, 302, 303 and 304. The disk 300 has a notch 297 into which the adjacent end of the arm 295 has fallen thus causing the inter-connected parts to properly move and shift the clutch 290 into engagement with the clutch member 289. The bank of cams 300 et. seq. is mounted on a shaft 298 which is suitably supported on the main platform 1, a worm gear 299 also being secured to the shaft above the bank of cams. The worm gear 299 meshes with a worm pinion 305 which is secured to a sleeve 306 loosely mounted on the shaft 12 (see Fig. 37) the end of the sleeve 306 having a toothed clutch member 307, secured thereon. A dog 308 is adapted to engage the member 307, the dog being mounted on a movable member 309 which is slidably mounted on the shaft 12. The member 309 is shifted by the arm 310 of a bell crank which is fulcrumed at 311 and has its other arm in engagement with a link 312 which is fulcrumed at 313 to a suitable bracket 314, as shown in Fig. 53. A bar 315 is pivoted to the upper end of the link 312 and extends laterally as shown, the opposite end of the bar 315 being provided with a slot 316 which terminates at one end in a recess 317; the underside of the bar 315 is formed with a heel 318 with which a latch 319 is adapted to be engaged at certain times. A pin 320 projects into the slot 316 and is secured to a slide rod 321. The slide rod 321 is moved in suitably disposed bearings, by a connecting rod 322; the connecting rod 322 is pivoted to the slide rod at one end and at the other end to a crank 323 which is secured to the end of the shaft 273.

The normal position of the parts is as shown in Fig. 53, at which time the gun platform 2 is at its lowermost position, this being indicated by the position of the crank 323 which is at the lowermost extremity of its stroke. The shaft 273, upon being rotated to elevate the platform 2, as previously described, moves the slide rod 322 forwardly during approximately one-half of its stroke and causes the link 312 to move in the direction of the arrow in Fig. 55; this rocks the bell crank on its fulcrum and causes the movable member 309 to move toward the member 307 until it becomes engaged by the dog 308. The dog 308 becomes again disengaged from the member 307 when the platform 2 reaches its maximum elevation, as when the crank 323 is in the position shown in Fig. 54 for at this time the slide rod 321 is moved rearwardly and since the bar 315 is carried with the rod (by reason of the pin connection 320) it follows that the bell crank 310 is rocked to cause the disengagement of the clutch elements 308 and 307. The inclination of the teeth of the member 307 provides for the rotation of the member 306 in a counterclockwise direction, i. e., when the dog 398 is in engagement with the member 307 and the shaft 12 is being rotated in a counterclockwise direction. Should the shaft 12 revolve in the clockwise direction, and the dog 308 be in engagement with the teeth 307, no movement will be imparted to the sleeve 306 since the dog will only slip over the teeth.

It has been shown how the gun platform 2 may be elevated and the gun rotated on its pivot 84, to distribute bullets over a predetermined range or field. The reversal of the motor 37 will again lower the gun platform 2, and it is now desired to disengage the dog 290 from the clutch member 289. To accomplish this the following actions take place: The shaft 273 is rotated in a counterclockwise direction in the manner previously described, until the crank 323 moves approximately one-third or nearly one-half of its stroke, the position it then assumes being shown in Fig. 55. The consequent action on the bell crank 310 will cause the dog 308 to engage the member 307. The motor 37 is now reversed causing the crank 323 to return; the pin 320 will now recede into the slot 316, since the bar 315 is now held up by the engagement of the heel 318 with the latch 319 thus the bar 315 will not be moved and the dog 308 will consequently remain in engagement with the toothed member 307. As soon as the motor 37 is reversed, the shaft 12 commences to revolve in a counterclockwise direction, this rotation causing the worm pinion 305 and the worm gear 299 also to revolve in the same direction thus in turn revolving the shaft 298 on which the bank of cams 300 et seq. is mounted. Immediately upon the commencement of the rotation of the shaft 298, the cam 303 will cause the cam arm 324 to rock on its fulcrum 325 (Figs. 37 and 40) and cause the latch 326 to move into engagement with the teeth of a spur gear 327 which is formed on the back of the bevel gear 19. The gear 19 is thus held from rotation and the shaft 12 is rotated in a counterclockwise direction as previously explained. The cam shaft 298 now being in motion, also causes the cam 300 (Fig. 46) to rotate in the counterclockwise direction (see arrow) and force the end of the arm 295 out of the notch 297. Movements are thus imparted to the connecting rod 294 and bell crank 293 in the directions of the arrows, causing the arm 291 to move the clutch 288 from engagement with the member 289; the revolution of the shaft 47 thus ceases. The movement of the shaft 292 for disengaging the clutch 288 also moves the arm 393 to which a link 394 (Fig. 41) is connected, the end of the link 394 having a pin and slot connection with the dog moving lever 31. The rotation of the shaft 292 to disengage the clutch 288, also rocks the lever 31 and frees the stop wheel 17 from the then engaging dog 35 and thus the shaft 12 may be freely revolved in either direction, as will be explained hereinafter.

The mechanism for tilting the platform 1 will now be introduced.

Reference to Figs. 37, 40 and 43 shows an arm 328 arranged to engage the cam 304, the arm being secured to a pivotal shaft 329, a suitable spring being coiled about the shaft in such a way as to normally urge the arm 328 into contact with the cam 304. Similar spring devices may be provided for the same purpose for each of the cam engaging arms. The shifting arm 328 is normally in contact with the neutral portion 330 of the cam 304 and this portion serves to hold the clutch 331 in the neutral or central position between the clutch faces 332 and 333 of the respective bevel gears 334 and 335, both of which are loosely mounted on the shaft 12; the clutch 331 has the usual spline connection with the shaft 12. Upon rotation of the cam 304, the arm 328 will be oscillated on its fulcrum 329 by reason of its alternate engagement with the depressions 336 and cam portions 337, and thus cause the clutch 331 to alternately engage one and then the other of the clutch faces 332 and 333 and rotate the thereto attached bevel gears 334 and 335. When the arm 328 is engaged by the first cam portion 337 (Fig. 43) the arm will be rocked on its fulcrum and the clutch 331 moved into engagement with the clutch member 332. It will be recalled that the gear 19 is locked by the latch 326 (see Fig. 37) and the shaft 12 may be rotated in either direction, accordingly as is necessary to do to perform the various functions of the mechanisms. Let it now be required to tilt the main platform 1 laterally from left to right, or vice versa, the shaft 180 forming the active member in this connection. The shaft 180 when actuated as will presently be described, will cause the worm gears 182 and 183 (Fig. 25$^B$) to operate and cause the platform 1 to tilt by reason of the engagement of the worm 183 with the fixed arcuate gear 184. By referring to Figs. 40 and 45, it will be seen that a worm wheel 339 is loosely mounted on the shaft 180 and this wheel is provided with a clutch face 340 with which the shiftable clutch 341 engages when moved into such an engagement by the arm 342. The rotation of the cam 301 (see arrow) causes the end of the arm 342 to drop into the notch 343 and cause the arm 342 to revolve on its fulcrum and in turn cause the clutches 340 and 341 to engage. A worm gear 344 meshes with the wheel 339, the gear 344 being keyed to the bottom of a vertical shaft 345 (Fig. 40) which is supported in a suitable bearing in the platform 1 and in a bearing bracket 346. Mounted on the upper end of the shaft 345 and above the bracket 346, is a composite bevel and spur gear 347 and 348, the bevel gear being in engagement with the teeth of the opposed gears 334 and 335. The engagement of the clutch elements 340 and 341, having been effected, the rotation of the shaft 12 in clockwise direction will in turn revolve the shaft 180 in a clockwise direction and thus tilt the platform 1 laterally. Should it be desired to tilt the platform laterally in the oposite direction, the cam shaft 298 is permitted to rotate slightly farther until the arm 328 (Fig. 43) drops into one of the depressions 336 which act will shift the clutch 331 into engagement with the opposite gear clutch face 333 whereupon the shaft 180 is rotated in a counterclockwise direction, the direction of the rotation of the shaft 345 being reversed by the rotation of the gear 335. It should be understood that the cam shaft 298 ceases to rotate when the shaft 12 is revolved in a clockwise direction, as it does when either of the gears 334 and 335 are driven as just explained. When the motor 37 is reversed, as it must be, to cause the cam shaft 298 to rotate, a little farther and cause the arm 328 to drop into a depression 336 from an adjacent cam surface 337, the engagement of the clutch 331 with either face 332 or 333 is not disturbed since a yielding connection 349 is interposed in the arm 328 (Fig. 37) which allows the teeth of the clutch 331 to slip over the teeth then in engagement. Similarly, the dog 308 slips over the teeth 307 when the shaft 12 moves in a clockwise direction. It should also be understood that the depression 343 (Fig. 45) is long enough to permit the little farther movement of the cam shaft 298 when it is desired to cause the arm 328 to move from 337 into a depression 336, and yet not cause the arm 342 to ride out of the depression 343. Should it now be desired to tilt the platform longitudinally (from front to back), the motor 37 is again reversed to cause the shaft 12 to rotate in a counterclockwise direction and in turn rotate the cam shaft 298 until the disk 301 moves far enough to disengage the arm 342 from the depression 343 and to move a raised portion 350 of the cam beneath an arm 351 which is thus caused to rock on its fulcrum and move a slidable clutch 352 into engagement with the clutch face of a worm wheel 353. The wheel 353 is loosely mounted on the longitudinally disposed shaft 233 which, upon engagement of the clutches, becomes the active element. A worm gear 354 on the shaft 345 meshes with the wheel 353. Now upon a reversal of the motor 37 so as to drive the shaft 12 in a clockwise direction, the wheel 353 is in turn driven in one or the other direction, depending on the engagement of the clutch 331 with one or the other of the gears 334 and 335, this clutch 331 being manipulated in a similar manner for the obtaining of the reversals of the shaft 233, as it was for driving the shaft 180.

A worm gear 202 (see Fig. 40), is mounted on shaft 201, similarly as shown in Figs. 25B and 28. The gear 202 meshes with a driving pinion 355 which is mounted on the shaft 345, the motion of the shaft 345 being imparted to the shaft 201 when the clutch 356 is moved into engagement with the clutch element 357 on the gear 202. The clutch 356 is shifted by an arm 358, the end of which is disposed in a groove 359 of the cam 302 (Fig. 42). The groove 359 of the cam 302 upon engaging the end of the arm 358, moves it on its fulcrum and brings the clutches 356 and 357 into engagement.

The amplitude of the oscillation of the gun in this instance is obtained by a means somewhat similar to that previously described and illustrated in Fig. 6. By reference to Figs. 50 and 51, it will be observed that the block 87 is arranged to move along the slideway of a laterally disposed arm of the gun pivot 84. The oscillator arm 82 is fulcrumed on the block 87 as has hereinbefore been explained, the amplitude of the oscillation of the gun pivot 84 being determined by the distance to which the fulcrum block 87 has been moved from the center of the pivot 84. The block is moved along its slideway by a screw 361 which engages the block in a suitable manner, a bevel pinion 362 being secured to the end of the screw shaft and located within the hollow gun pivot. The pinion 362 is engaged by a bevel gear 363 (Fig. 52) on a tubular shaft 364 which has suitable bearing in the pivot 84, and the shaft 364 is provided with a spur gear 365 at the lower end with which a driving gear 366 meshes. The shaft of the gear 366 is provided with a universal joint 367 which is connected to a flexible shaft 368; the flexible shaft 368 terminates in a relatively fixed end 369 which is mounted in the bearings of the bracket 346 (Fig. 40) and the platform 1. The shaft end 369 is provided with a fixed clutch element with which the movable clutch 370 cooperates, the clutch 370 having a slidable keyed connection with the collar 371 of a gear 372. The gear 372 meshes with the driving gear 348 on the shaft 345, previously described. The clutch 370 is shifted into and out of engagement with the fixed element of the shaft 369, by an arm 373, the opposite end of which engages the groove 359 of the cam 302 (Figs. 40 and 44). When the elevated portion 360 of the cam groove is moved into engagement with the end of the arm 373, the clutch 370 is shifted and the flexible shaft 368 is driven. The direction of the rotation of the flexible shaft 368 is obtained by rotating one or the other of the gears 334 and 335 through the medium of the shiftable clutch 331 and it is thought that from the previous description of this reversing mechanism, the manner of revolving the shaft 368 one way or the other, will be readily understood. The revolution of the shaft 368 regulates the position of the block 87 and consequently increases or lessens the angle of oscillation of the gun.

As has previously been explained, the gun is fired as soon as it is moved to its elevated position. The firing is accomplished by a trigger rod 374 (Fig. 51) which connects in any suitable manner to the trigger 124. An arm 375 is in turn connected to the rod 374 by an interposed link, the arm 375 being secured at the upper end of a shaft 376 which, as shown in Fig. 52, is disposed within the tubular shaft 364. A pinion 377 is located at the lower end of the shaft 376 and a bevel pinion 378 which is mounted on a bracket 379, meshes with the pinion 377, as shown in Fig. 49. A moving rod 380 is attached to the pinion 378 and the rod 380 extends forwardly and engages the yoke 381. The yoke 381 is provided with trunnions 382 at each side, by which the yoke is pivoted in bearings 383 pendent from the underside of the platform 2, (Fig. 47). A crank arm 384 is secured to one of the trunnions 382 and the arm has a pin and slot connection with a link 385 which is fulcrumed at its other end to a standard 386. The link 385 is elevated when the gun platform 2 is elevated, as shown in Fig. 47, by an arm 403 which engages the link 385. When the platform 2 is down as in Fig. 48, the yoke 381 and the moving arm 380 are disposed horizontally, but on elevating the platform 2, the shaft 376 is rotated through the medium of the arm 380 and gears 378 and 377, causing the arm 375 (Fig. 51) to move and operate the gun trigger mechanism. A spring 387 which is connected to the crank 384 and to the platform 2, serves to assist the turning of the crank 384 on its trunnions 382. The various functions of the cams 300 *et seq.* having been performed, the cam shaft is now permitted to rotate until a pin 388, which is mounted on the gear 299 (Fig. 37), engages one end of a shifting crank 389, the other end of the crank being in engagement with a second collar on the movable clutch element 309. The crank 389 on being turned on its fulcrum, by the pin 388, moves the clutch element 309 away from the toothed element 307 on the shaft 12, whereupon the cam shaft 298 ceases to rotate through the medium of the intermeshing worm gear 305. The cam shaft 298 is, however, revolved a short distance to carry the cams to a neutral position, by the engagement of the pawl end 390 of an eccentric 39, with a rack 392 which is completely moved from the range of the pawl 390 thus again stationing the cams 300 *et seq.* at their former neutral positions.

Fig. 14 illustrates a system of signaling the positions of the gun carriage, a contact sector 127 being utilized for this purpose, as has previously been explained. This same device may be used in the latter embodiment of the invention, although it has not been so illustrated. Fig. 38, however, shows a device which may be used to signal the positions of the cam bank 300 to the operator and it consists of a contact making arm 395 which may be secured to a suitable one of the cams, the connection being in this instance made with the cam 304. Disposed in the path of the arm 395 is an electrical contact making spring 396 which is mounted with a coöperating contact 397 on an insulating base 398 and line wires lead from these contacts to the operator's post in any convenient manner. While I have shown only one arm 395, it will be obvious that should conditions require the addition of a plurality of these arms, each of which is especially adapted to coöperate with individual contact devices 396—397, they may be provided.

As an extra precaution against the accidental turning of the various shafts 47—180—233, etc., I have provided a locking device of which that shown for the shaft 233 in Fig. 37, is symbolic of all. The locking device consists of a spring pressed latch 399 which is adapted to engage a toothed wheel 400 on the shaft 233 when that shaft has been suitably adjusted as was explained in a previous instance. The latch 399 is operated by the movement of a crank 401 on the shaft 292 (Fig. 41) at such a time when the shaft 292 is rotated for the purpose. A similar latch device 402 may be provided for the shaft 180 (Fig. 41) as well as for any other moving shaft which is likely to vibrate when it is once adjusted, although ordinarily the worm gears, which are extensively used in this device, do not ordinarily "back up."

While I have shown several modifications of the invention in the preferred forms, yet it is obvious that changes in the details of construction, arrangement and design of parts may be made to suit the requirements of the particular uses to which the invention is to be put, without departing from the spirit of the invention or the scope of the appended claims.

What I claim is:

1. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, and instrumentalities for controlling said motor from a distance.

2. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, and means for signaling the position of said bed.

3. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed.

4. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until such raising mechanism has been actuated to elevate the bed, and means for reversing the action of said motor to lower the bed.

5. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, means for reversing the action of said motor to lower the bed, and a device to render said oscillating mechanism inactive during the lowering act.

6. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms, and including devices for holding said connections inactive with relation to said oscillating mechanism until said raising mechanism has been actuated to elevate the bed, means for reversing the action of said motor to lower the bed, a gun trigger operating mechanism, and means for operating said gun trigger operating mechanism upon elevation of the bed.

7. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, means for reversing the action of said motor to lower the bed, a device to render said oscillating mechanism inactive during the lowering act, a gun trigger operating mechanism, and means for operating said gun trigger operating mechanism upon elevation of the bed.

8. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, a gun trigger operating mechanism, and means for operating said gun trigger operating mechanism upon elevation of the bed.

9. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, means for controlling the action of said motor to raise and lower the bed, said motor controlling mechanism including operator manipulated instrumentalities for effecting the forward and reversing action of said motor, and mechanism for varying the effective range of action of said oscillating mechanism to sweep the horizon.

10. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, means for controlling the action of said motor to raise and lower the bed, a device to render said oscillating mechanism inactive during the lowering act, said motor controlling mechanism including operator manipulated instrumentalities for effecting forward and reverse action of said motor, and mechanism for varying the effective range of action of said oscillating mechanism to sweep the horizon.

11. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, a gun trigger operating mechanism, means for operating said gun trigger operating mechanism upon elevation of the bed, motor controlling mechanism including operator manipulated instrumentalities for effecting forward and reverse action of said motor, and mechanism for varying the effective range of action of said oscillating mechanism to sweep the horizon.

12. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, means for controlling the action of said motor to raise and lower the bed, a device to render said oscillating mechanism inactive during the lowering act, a gun trigger operating mechanism, means for operating said gun trigger operating mechanism upon elevation of the bed, said motor controlling mechanism including operator manipulated instrumentalities for effecting forward and reverse action of said motor, and mechanism for varying the effective range of action of said oscillating mechanism to sweep the horizon.

13. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, a gun trigger operating mechanism, means for operating said gun trigger operating mechanism upon elevation of the bed, motor controlling mechanism including operator manipulated instrumentalities for effecting forward and reverse action of said motor, mechanism for varying the effective range of action of said oscillating mechanism to sweep the horizon, and coöperative signaling devices for advising the operator of the movement of the bed in effecting the control of the bed elevating and gun oscillating mechanisms.

14. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, means for controlling the action of said motor to raise and lower the bed, a device to render said oscillating mechanism inactive during the lowering act, said motor controlling mechanism including operator manipulated instrumentalities for effecting forward and reverse action of said motor, mechanism for varying the effective range of action of said oscillating mechanism to sweep the horizon, and coöperative signaling devices for advising the operator of the movements of the bed in effecting the control of the bed elevating and gun oscillating mechanisms.

15. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, means for reversing the action of said motor to lower the bed, said motor energizing mechanism including operator manipulated instrumentalities for effecting forward and reversing action of said motor, mechanism for varying the effective range of action of said oscillating mechanisms to sweep the horizon, and coöperative signaling devices for advising the operator of the movements of the bed in effecting the control of the bed elevating and gun oscillating mechanisms.

16. In an apparatus of the character stated, a machine gun, a disappearing bed upon which the gun is mounted, a base, hinged connecting legs between said bed and base, mechanism for raising said bed, a gun oscillating mechanism, a driving motor, operating connections between said motor and said raising and oscillating mechanisms and including devices for holding said connections inactive with relation to said oscillating mechanism until said raising mechanism has been actuated to elevate the bed, means for reversing the action of said motor to lower the bed, a device to render said oscillating mechanism inactive during the lowering act, a gun trigger operating mechanism, means for operating the gun trigger operating mechanism upon elevation of the bed, said motor energizing mechanism including operator manipulated instrumentalities for effecting forward and reverse action of said motor, mechanism for varying the effective range of action of said oscillating mechanism to sweep the horizon, and coöperative signaling devices for advising the operator of the movements of the bed in effecting the control of the bed elevating and gun oscillating mechanisms.

17. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism.

18. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, devices for holding said power transmitting mechanism for oscillating mechanism inactive until after said bed elevating mechanism has been operated.

19. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, and means for reversing the action of said motor to lower said bed.

20. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, devices for holding said second power transmitting mechanism and oscillating mechanism inactive until after said bed elevating mechanism has been operated, and means for reversing the action of said motor to lower said bed.

21. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, means for reversing the action of said motor to lower said bed, said power transmitting mechanism for said oscillating mechanism including a one-way-only transmission coupling with said oscillating mechanism whereby on reversal of said motor said oscillating mechanism will cease operating.

22. In an apparatus of the character stated, a base, a bed, legs pivoted to said bed and to the base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, a device for holding said power transmitting mechanism for the oscillating mechanism inactive until after said bed elevating mechanism has been operated, means for reversing the action of said motor to lower said bed, said power transmitting mechanism for said oscillating mechanism including a one-way-only transmission coupling with said oscillating mechanism whereby on reversal of said motor said oscillating mechanism will cease operating.

23. In an apparatus of the character stated, a base, a bed movably connected with the base, and adapted to be raised and lowered with relation thereto, a machine gun on the bed, a gun oscillating mechanism, and a motor driven apparatus operating during the initial part of its action to raise the bed and upon further action to operate said oscillating mechanism.

24. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, means for reversing the operation of the driving motor to lower the bed, and means for operatively disconnecting the oscillating mechanism from said apparatus during the reversal period.

25. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, a mechanically operated and timed device for reversing the operation of the driving motor to lower the bed, and means for operatively disconnecting the oscillating mechanism from said apparatus during the reversal period.

26. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, and operator manipulated motor controlling instrumentalities whereby the motor driven apparatus may be operated to raise or lower the bed at will.

27. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, and operator manipulated motor controlling instrumentalities whereby the motor driven apparatus may be operated to raise or lower the bed at will, and mechanism for varying the degree of oscillation of the gun.

28. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, and operator manipulated motor controlling instrumentalities whereby the motor driven apparatus may be operated to raise or lower the bed at will, mechanism for varying the degree of oscillation of the gun, and devices actuated through the raising and lowering of the bed for operating said varying mechanism.

29. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, operator manipulated motor controlling instrumentalities whereby the motor driven apparatus may be operated to raise or lower the bed at will, mechanism for varying the degree of oscillation of the gun, devices actuated through the raising and lowering of the bed for operating said varying mechanism, and return signal mechanism for guiding the operator in the manipulation of the motor for effecting the operations of the aforesaid structure.

30. In an apparatus of the character stated, a base, a bed movably connected with the base and adapted to be raised and lowered with relation thereto, a machine gun on the bed, a gun oscillating mechanism, a motor driven apparatus operating during the initial part of its action to raise the bed and upon further action to operate said oscillating mechanism, operator manipulated motor controlling instrumentalities whereby the motor driven apparatus may be operated to raise or lower the bed at will, mechanism for varying the degree of oscillation of the gun, devices actuated through the raising and lowering of the bed for operating said varying mechanism, a gun firing device, and means brought into action upon the elevation of the bed for actuating said firing device.

31. In an apparatus of the character stated, a base, a bed movably connected with the base and adapted to be raised and lowered with relation thereto, a machine gun on the bed, a gun oscillating mechanism, a motor driven apparatus operating during the initial part of its action to raise the bed and upon further action to operate said oscillating mechanism, and operator manipulated motor controlling instrumentalities whereby the motor driven apparatus may be operated to raise or lower the bed at will, a gun firing device and means brought into action upon the elevation of the bed for actuating said firing device.

32. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, means for reversing the operation of the driving motor to lower the bed, means for operatively disconnecting the oscillating mechanism from said apparatus during the reversal period, a gun firing device, and means brought into action upon the elevation of the bed for actuating said firing device.

33. In an apparatus of the character stated, a base, a bed movably connected with the base and adapted to be raised and lowered with relation thereto, a machine gun on the bed, a gun oscillating mechanism, a motor driven apparatus operating during the initial part of its action to raise the bed and upon further action to operate said oscillating mechanism, operator manipulated motor controlling instrumentalities whereby the motor driven apparatus may be operated to raise or lower the bed at will, mechanism for varying the degree of oscillation of the gun, a gun firing device, and means brought into action upon the elevation of the bed for actuating said firing device.

34. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, operator manipulated motor controlling instrumentalities whereby the motor driven apparatus may be operated to raise or lower the bed at will, mechanism for varying the degree of oscillation of the gun, devices actuated through the raising and lowering of the bed for operating said varying mechanism, return signal mechanism for guiding the operator in the manipulation of the motor for effecting the operations of the aforesaid structure, a gun firing device, and means brought into action upon the elevation of the bed for actuating said firing device.

35. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, a mechanically operated and timed device for reversing the operation of the driving motor to lower the bed, means for operatively disconnecting the oscillating mechanism from said apparatus during the reversal period, a gun firing device, and means brought into action upon the elevation of the bed for actuating said firing device.

36. In an apparatus of the character stated, a base, a bed movably connected with the base, and adapted to be raised and lowered with relation thereto, a machine gun on the bed, a gun oscillating mechanism, a motor driven apparatus operating during the initial part of its action to raise the bed and upon further action to operate said oscillating mechanism, a gun firing device, and means brought into action upon the elevation of the bed for actuating said firing device.

37. In an apparatus of the class described, a base, a bed, a bed supporting connection between the base and the bed whereby the bed may be raised or lowered, operator controlled means for raising and lowering said bed, a gun pivoted on said bed, a gun oscillating mechanism including an arm projecting from the gun pivot, a block shiftably mounted on said arm, a crank mechanism linked to said block for oscillating the gun, and means for shifting said block to vary the degree of oscillation.

38. In an apparatus of the class described, a base, a bed, a bed supporting connection between the base and the bed whereby the bed may be raised or lowered, operator controlled means for raising and lowering said bed, a gun pivoted on said bed, a gun oscillating mechanism including an arm projecting from the gun pivot, a block shiftably mounted on said arm, a crank mechanism linked to said block for oscillating the gun, a reversible rotatable drum shaft, a cable wound on said drum shaft, guide pulleys for said cable, said cable being connected to said block for shifting purposes, and means for turning said drum shaft.

39. In an apparatus of the class described, a base, a bed, a bed supporting connection between the base and the bed whereby the bed may be raised or lowered, operator controlled means for raising and lowering said bed, a gun pivoted on said bed, a gun oscillating mechanism including an arm projecting from the gun pivot, a block shiftably mounted on said arm, a crank mechanism linked to said block for oscillating the gun, a reversible rotatable drum shaft, a cable wound on said drum shaft, guide pulleys for said cable, said cable being connected to said block for shifting purposes, and pawl and ratchet devices effective upon successive partial raising and lowering of the bed for turning said drum shaft.

40. In an apparatus of the class described, a base, a bed, a bed supporting connection between the base and the bed whereby the bed may be raised or lowered, operator controlled means for raising and lowering said bed, a gun pivoted on said bed, a gun oscillating mechanism including an arm projecting from the gun pivot, a block shiftably mounted on said arm, a crank mechanism linked to said block for oscillating the gun, a reversibly rotatable drum shaft, a cable wound on said drum shaft, guide pulleys for said cable, said cable being connected to said block for shifting purposes, pawl and ratchet devices effective upon successive partial raising and lowering of the bed for turning said drum shaft, means rendering said pawl and ratchet devices inoperative after the bed has been raised to the firing position.

41. In an apparatus of the class described, a base, a bed, a bed supporting connection between the base and the bed whereby the bed may be raised or lowered, operator controlled means for raising and lowering the bed, a gun pivoted on said bed, a gun oscillating mechanism including an arm projecting from the gun pivot, a block shiftably mounted on said arm, a crank mechanism linked to said block for oscillating the gun, a reversible rotatable drum shaft, a cable wound on said drum shaft, guide pulleys for said cable, said cable being connected to said block for shifting purposes, pawl and ratchet devices for turning said drum shaft, and a pawl retriever, and an actuating stop for said retriever to render said pawl and ratchet devices non-operative after the bed has been elevated beyond a predetermined amount.

42. In an apparatus of the class described, a base, a bed, a bed supporting connection between the base and the bed whereby the bed may be raised or lowered, means for raising and lowering the said bed, a gun pivoted on said bed, a gun oscillating mechanism including an arm projecting from the gun pivot, a block shiftably mounted on said arm, a crank mechanism linked to said block for oscillating the gun, and means for shifting said block to vary the degree of oscillation.

43. In an apparatus of the class described, a base, a bed, a bed supporting connection between the base and the bed whereby the bed may be raised or lowered, means for raising and lowering said bed, a gun pivoted on said bed, a gun oscillating mechanism including an arm projecting from the gun pivot, a block shiftably mounted on said arm, a crank mechanism linked to said block for oscillating the gun, a reversible rotatable drum shaft, a cable wound on said drum shaft, guide pulleys for said cable, said cable being connected to said block for shifting purposes and means for turning said drum shaft.

44. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalites for controlling said motor from a distance, and mechanism for tilting said base laterally.

45. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for signaling the position of said bed, and mechanism for tilting said base laterally.

46. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, and mechanism for tilting said base longitudinally.

47. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for signaling the position of said bed, and means for tilting said base longitudinally.

48. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for mounting said base for universal adjustment and devices for tilting said base.

49. In combination, a machine gun, a disappearing bed on which the gun is mounted, a base, legs hinged to the bed and base for supporting the bed, mechanism for raising and lowering said bed, a motor operating said mechanism, gun trigger operating mechanism, means for setting said trigger operating mechanism in action when said bed is raised, instrumentalities for controlling said motor from a distance, means for signaling the position of said bed, means for mounting said base for universal adjustment, and devices for tilting said base.

50. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for signaling the position of said bed, means for mounting said base for universal adjustment, and devices for tilting said base either laterally or longitudinally or both.

51. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for mounting said base for universal adjustment, and devices for tilting said base either laterally or longitudinally or both.

52. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, mechanism for tilting said base longitudinally, and mechanism for turning said base about a vertical axis.

53. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for signaling the position of said bed, mechanism for tilting said base, and mechanism for turning said base about a vertical axis.

54. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for signaling the position of said bed, means for mounting said base for universal adjustment, devices for tilting said base, and mechanism for turning said base about a vertical axis.

55. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, mechanism for tilting said base laterally, and mechanism for turning said base about a vertical axis.

56. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for mounting said base for universal adjustment, devices for tilting said base, and mechanism for turning said base about a vertical axis.

57. In combination, a machine gun, a disappearing bed on which the gun is mounted, a base, legs hinged to the bed and base for supporting the bed, mechanism for raising and lowering said bed, a motor for operating said mechanism, gun trigger operating mechanism, means for setting said trigger operating mechanism in action when said bed is raised, instrumentalities for controlling said motor from a distance, means for signaling the position of said bed, means for tilting said base longitudinally, and mechanism for turning said base about a vertical axis.

58. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, a foundation, means for adjustably mounting said base on said foundation, base turning mechanism and power transmitting mechanism also driven by said motor for operating said base turning mechanism.

59. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, a foundation, means for adjustably mounting said base on said foundation, base turning mechanism, power transmitting mechanism also driven by said motor for operating said base turning mechanism, and operator controlled instrumentalities for effecting the action of said base-turning power-transmitting mechanism.

60. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, base tilting mechanism and power transmitting devices for operating said tilting mechanism.

61. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, a foundation, means for adjustably mounting said base on said foundation, base turning mechanism, power transmitting mechanism also driven by said motor for operating said base turning mechanism, base tilting mechanism, and power transmitting devices for operating said base tilting mechanism.

62. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, base tilting mechanism, power transmitting devices for operating said tilting mechanism, and instrumentalities for rendering said base tilting mechanism active or inactive at will.

63. In an apparatus of the character stated, a base, a bed, legs pivoted to said bed and to said base, a member for holding said bed elevated, a motor, a power transmitting mechanism driven by said motor for raising said bed, means for controlling said motor, a machine gun on said bed, mechanism for oscillating said gun, power transmitting mechanism also driven by said motor for operating said oscillating mechanism, a foundation, means for adjustably mounting said base on said foundation, base turning mechanism and power transmitting mechanism also driven by said motor for operating said base turning mechanism, base tilting mechanism, power transmitting devices for operating said base tilting mechanism, and instrumentalities for rendering said base tilting mechanism active or inactive at will.

64. In an apparatus of the character described, a foundation; a base mounted on said foundation for universal movement; a bed; connections between said bed and base whereby said bed may be raised and lowered; a machine gun pivoted on said bed to turn about a vertical axis; a bed raising and lowering mechanism; a gun oscillating mechanism; a base tilting mechanism; a base rotating mechanism; and power applying apparatus for operating said bed raising and lowering mechanism, said base tilting mechanism and said base rotating mechanism.

65. In an apparatus of the character described, a foundation; a base mounted on said foundation for universal movement; a bed; connections between said bed and base whereby said bed may be raised and lowered; a machine gun pivoted on said bed to turn about a vertical axis; a bed raising and lowering mechanism; a gun oscillating mechanism; a base tilting mechanism; a base rotating mechanism; a power applying apparatus for operating said bed raising and lowering mechanism, said base tilting mechanism and said base rotating mechanism, and selective devices for setting said power applying apparatus to actuate either or all of said bed raising and lowering and said base tilting and rotating mechanisms.

66. In an apparatus of the character described, a foundation; a base mounted on said foundation for universal movement; a bed; connections between said bed and base whereby said bed may be raised and lowered; a machine gun pivoted on said bed to turn about a vertical axis; a bed raising and lowering mechanism; a gun oscillating mechanism; a base tilting mechanism; a base rotating mechanism; a power applying apparatus for operating said bed raising and lowering mechanism, said base tilting mechanism and said base rotating mechanism, and coöperative signaling instrumentalities for advising the distant operator of the position and action of the controlled parts.

67. In an apparatus of the character described, a foundation; a base mounted on said foundation for universal movement; a bed; connections between said bed and base whereby said bed may be raised and lowered; a machine gun pivoted on said bed to turn about a vertical axis; a bed raising and lowering mechanism; a gun oscillating mechanism; a base tilting mechanism; a base rotating mechanism; a power applying apparatus for operating said bed raising and lowering mechanism, said base tilting mechanism and said base rotating mechanism, selective devices for setting said power applying apparatus to actuate either or all of said bed raising and lowering, base tilting and rotating mechanisms, and coöperative signaling instrumentalities for advising the distant operator of the position and action of the controlled parts.

68. In an apparatus of the character described, a foundation; a base mounted on said foundation for universal movement; a bed; connections between said bed and base whereby said bed may be raised and lowered; a machine gun pivoted on said base to turn about a vertical axis; a bed raising and lowering mechanism; a gun oscillating mechanism; a base tilting mechanism; a base rotating mechanism; a power applying apparatus for operating said bed raising and lowering mechanism, said base tilting mechanism and said base rotating mechanism, a gun firing device, and mechanism for moving said device into the firing position upon substantially the full elevation of the bed.

69. In an apparatus of the character described, a foundation; a base mounted on said foundation for universal movement; a bed; connections between said bed and base whereby said bed may be raised and lowered; a machine gun pivoted on said bed to turn about a vertical axis; a bed raising and lowering mechanism; a gun oscillating mechanism; a base tilting mechanism; a base rotating mechanism; a power applying apparatus for operating said bed raising and lowering mechanism, said base tilting mechanism and said base rotating mechanism, selective devices for setting said power applying apparatus to actuate either or all of said base raising and lowering, said base tilting and rotating mechanisms, a gun firing device, and mechanism for moving said device into the firing position upon substantially the full elevation of the bed.

70. In an apparatus of the character described; a foundation; a base mounted on said foundation for universal movement; a bed; connections between said bed and base whereby said bed may be raised and lowered; a machine gun pivoted on said bed to turn about a vertical axis; a bed raising and lowering mechanism; a gun oscillating mechanism; a base tilting mechanism; a base rotating mechanism; a power applying apparatus for operating said bed raising and lowering mechanism, said base tilting mechanism and said base rotating mechanism, selective devices for setting said power applying apparatus to actuate either or all of said bed raising and lowering, said base tilting and rotating mechanisms, coöperative signaling instrumentalities for advising the distant operator of the position and action of the controlled parts, a gun firing device, and mechanism for moving said device into the firing position upon substantially the full elevation of the bed.

71. An apparatus of the class described comprising the following elements in combination; a foundation; a base universally movably mounted on said foundation; a bed and connections between said bed and base whereby said bed is susceptible of being raised and lowered; a machine gun on said bed; a gun trigger operating device; a gun oscillating mechanism; a bed raising and lowering apparatus; a base rotating mechanism, a base tilting mechanism; a driving motor for said mechanisms; and instrumentalities for controlling the operation of each of said mechanisms.

72. An apparatus of the class described comprising the following elements in combination; a foundation; a base universally movably mounted on said foundation; a bed and connections between said bed and base whereby said bed is susceptible of being raised and lowered, a machine gun on said bed; a gun trigger operating device; a gun oscillating mechanism; a bed raising and lowering apparatus; a base rotating mechanism, a base tilting mechanism; a driving motor for said mechanisms; and instrumentalities for controlling the operation of each of said mechanisms, said instrumentalities including selective devices for setting any of said mechanisms into action.

73. An apparatus of the class described comprising the following elements in combination; a foundation; a base universally movably mounted on said foundation; a bed and connections between said bed and base whereby said bed is susceptible of being raised and lowered, a machine gun on said bed; gun trigger operating device; a gun oscillating mechanism; a bed raising and lowering apparatus; a base rotating mechanism, a base tilting mechanism; a driving motor for said mechanisms; instrumentalities for controlling the operation of each of said mechanisms, said instrumentalities including selective mechanism operative by partially elevating and lowering the bed.

74. In an apparatus of the class described comprising the following elements in combination, a foundation; a base; a bed; a machine gun on the bed, gun oscillating mechanism; bed elevating mechanism; gun firing mechanism; means for operating said firing mechanism; means for varying the degree of oscillation of said gun oscillating mechanism; means for turning said base on a vertical axis over said foundation, and means for tilting said base with relation to the horizontal.

75. In an apparatus of the class described comprising the following elements in combination, a foundation; a base; a bed; a machine gun on the bed, gun oscillating mechanism; bed elevating mechanism; gun firing mechanism; means for operating said firing mechanism; means for varying the degree of oscillation of said gun oscillating mechanism; means for turning said base on a vertical axis over said foundation, means for tilting said base with relation to the horizontal, and a pit cover carried by the bed and held over the gun.

76. In an apparatus of the class described comprising the following elements in combination, a foundation; a base; a bed; a machine gun on the bed, gun oscillating mechanism; bed elevating mechanism; gun firing mechanism; means for operating said firing mechanism; means for varying the degree of oscillation of said gun oscillating mechanism; means for turning said base on a vertical axis over said foundation, means for tilting said base with relation to the horizontal, and means for protecting the gun against the fire of the enemy.

77. In an apparatus of the character stated, a base, a bed, legs pivoted to said bed and to said base, a motor, a power transmitting mechanism driven by said motor for raising said bed, means for controlling said motor, a machine gun on said bed, mechanism for oscillating said gun, power transmitting mechanism also driven by said motor for operating said oscillating mechanism, a foundation, means for adjustably mounting said base on said foundation, base turning mechanism and power transmitting mechanism also driven by said motor for operating said base turning mechanism.

78. In an apparatus of the character stated, a base, a bed, legs pivoted to said bed and to said base, a motor, power transmitting mechanism driven by said motor for raising said bed, means for controlling said motor, a machine gun on said bed, mechanism for oscillating said gun, power transmitting mechanism also driven by said motor for operating said oscillating mechanism, a foundation, means for adjustably mounting said base on said foundation, base turning mechanism and power transmitting mechanism also driven by said motor for operating said base turning mechanism, and operator controlled instrumentalities for effecting the action of said base-turning power-transmitting mechanism.

79. In an apparatus of the character stated, a base, a bed, legs pivoted to said bed and to said base, a motor, a power transmitting mechanism driven by said motor for raising said bed, means for controlling said motor, a machine gun on said bed, mechanism for oscillating said gun, power transmitting mechanism also driven by said motor for operating said oscillating mechanism, base tilting mechanism and power transmitting devices for operating said tilting mechanism.

80. In an apparatus of the character stated, a gun, a disappearing bed upon which the gun is mounted, a base, means connecting said bed and base for parallel motion toward and from each other, power operated mechanism for raising and lowering said bed, a foundation structure on which said base is mounted, worm and gear devices for tilting said base laterally and longitudinally, power transmitting mechanism including shiftable clutch devices for bringing said worm and gear devices into action, and controlling instrumentalities for effecting the operation of the aforesaid parts at the will of the operator.

81. In an apparatus of the character stated, a gun, a disappearing bed upon which the gun is mounted, a base, means connecting said bed and base for parallel motion toward and from each other, power operated mechanism for raising and lowering said bed, a foundation structure on which said base is mounted, worm and gear devices for tilting said base laterally and longitudinally, power transmitting mechanism including shiftable clutch devices for bringing said worm and gear devices into action, controlling instrumentalities for effecting the operation of the aforesaid parts at the will of the operator, said controlling instrumentalities including cam and lever devices for selectively operating said clutches.

82. In an apparatus of the character stated, a disappearing bed, a base, supporting connections between said bed and base whereby said bed may be raised and lowered, instrumentalities for raising and lowering said bed, a foundation, means for supporting said base on said foundation for universal adjustment of the base, devices for turning said base on a vertical axis, other devices for tilting said base, power operated mechanism coöperative with the aforesaid structure to effect the movement of the same and controlling instrumentalities coöperative with said power mechanism for selectively bringing the respective mechanisms into action as desired.

ADDISON BURGESS KNOTTS.

Copies of this patent may be obtained for five cents each, by addressing the "Commissioner of Patents, Washington, D. C."